United States Patent
Lauber et al.

(10) Patent No.: US 11,173,418 B2
(45) Date of Patent: Nov. 16, 2021

(54) MATERIALS AND METHODS FOR TRAP-ELUTE MIXED MODE CHROMATOGRAPHY

(71) Applicant: WATERS TECHNOLOGIES CORPORATION, Milford, MA (US)

(72) Inventors: Matthew A. Lauber, North Smithfield, RI (US); Babajide O. Okandeji, Providence, RI (US)

(73) Assignee: Waters Technologies Corporation, Milford, MA (US)

( * ) Notice: Subject to any disclaimer, the term of this patent is extended or adjusted under 35 U.S.C. 154(b) by 121 days.

(21) Appl. No.: 16/506,801

(22) Filed: Jul. 9, 2019

(65) Prior Publication Data

US 2020/0016511 A1  Jan. 16, 2020

Related U.S. Application Data

(60) Provisional application No. 62/696,694, filed on Jul. 11, 2018.

(51) Int. Cl.
*B01D 15/18* (2006.01)
*B01D 15/14* (2006.01)
*B01D 15/36* (2006.01)

(52) U.S. Cl.
CPC ......... *B01D 15/1871* (2013.01); *B01D 15/14* (2013.01); *B01D 15/363* (2013.01)

(58) Field of Classification Search
CPC ............ B01D 15/327; B01D 15/1864; B01D 15/1871; B01D 15/1878; B01D 15/3847
See application file for complete search history.

(56) References Cited

U.S. PATENT DOCUMENTS 5,071,547 A * 12/1991 Gazer ................ B01D 15/1864
                                                            210/198.2
2011/0315633 A1   12/2011 Cormier et al.
(Continued)

FOREIGN PATENT DOCUMENTS

WO   WO-2009023268 A1 *  2/2009  ......... B01D 15/1864
WO     2011017418 A1     2/2011
(Continued)

OTHER PUBLICATIONS

International Search Report and Written Opinion for International application No. PCT/US2019/041059, dated Nov. 5, 2019, 9 pages.
(Continued)

*Primary Examiner* — Ryan B Huang
(74) *Attorney, Agent, or Firm* — Kacvinsky Daisak Bluni PLLC

(57) ABSTRACT

In various aspects, the present disclosure pertains to materials (e.g., kits, column assemblies, liquid chromatography systems, etc.) methods for performing liquid chromatography that employ a first column (e.g., a trapping column) and a second column (e.g., an analytical column). The first column comprises a first chromatographic material having a first chromatographic surface that comprises first hydrophobic surface groups and first ionizable surface groups having a first pKa value. The second column comprises a second chromatographic material having a second chromatographic surface that comprises second hydrophobic surface groups and (a) permanently ionized surface groups or (b) second ionizable surface groups having a second pKa value. The first hydrophobic surface groups have a hydrophobicity that is less than a hydrophobicity of the second hydrophobic surface groups. Moreover, where the second chromatographic surface comprises second ionizable surface groups, the first pKa value may differ from the second pKa value by 1-12 units.

28 Claims, 9 Drawing Sheets

(56) References Cited

U.S. PATENT DOCUMENTS

2013/0319086 A1* 12/2013 Wyndham .............. B01D 15/36
                                                                    73/61.54
2015/0047730 A1   2/2015 Dourdeville et al.
2017/0100682 A1*  4/2017 Wikfors ................ G01N 30/32

FOREIGN PATENT DOCUMENTS

| WO | 2013049622 A1 | 4/2013 |
| WO | 2013173494 A1 | 11/2013 |
| WO | 2016069764 A1 | 5/2016 |
| WO | 2017189357 A2 | 11/2017 |

OTHER PUBLICATIONS

Vreeken, R. J., et al., "Coupling of ion-pair liquid chromatogrpahy and thermospray mass spectrometry via phase-system switching with a polymerica trapping column", Journal of Chromatography A, 654(1):65-77 (1993).

Capriotta, A. L, et al., "Intact protein separation by chromatographic and/or electrophoretic techniques for top-down proteomics", Journal of Chormatogrpahy A, 1218(49):8760-8776 (1993).

Hennion, M-C., "Solid-phase extraction: method development, sorbetns, and coupling with liquid chromatogrpahy", Journal of Chromatogrpahy A, 856(1-2):3-54 (1999).

Lauber, et al., "Rapid Preparation of Released N-Glycans for HILIC Analysis Using a Labeling Reagent that Facilitiates Sensitive Fluorescence and ESI-MS Detection," Anal Chem 87:5401-5409 (2015).

* cited by examiner

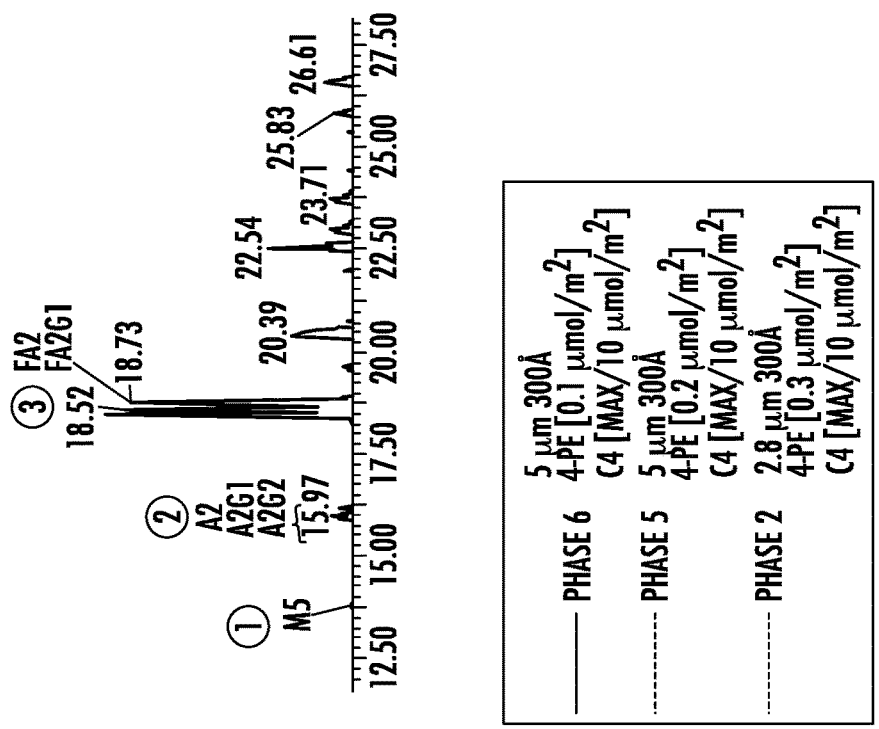
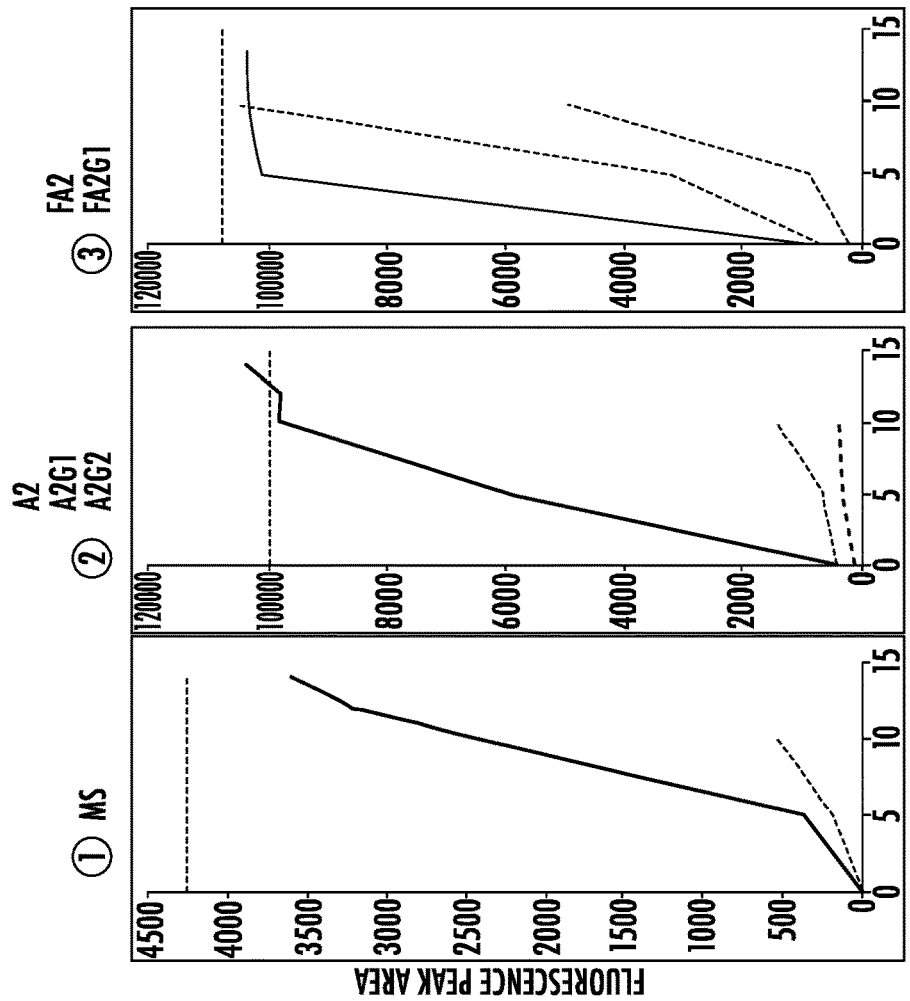

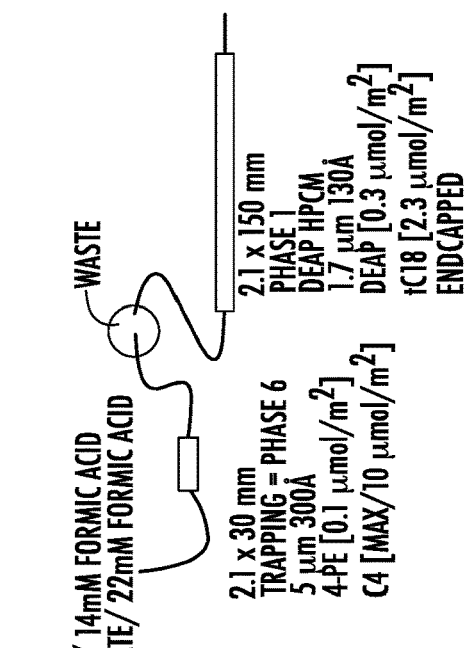
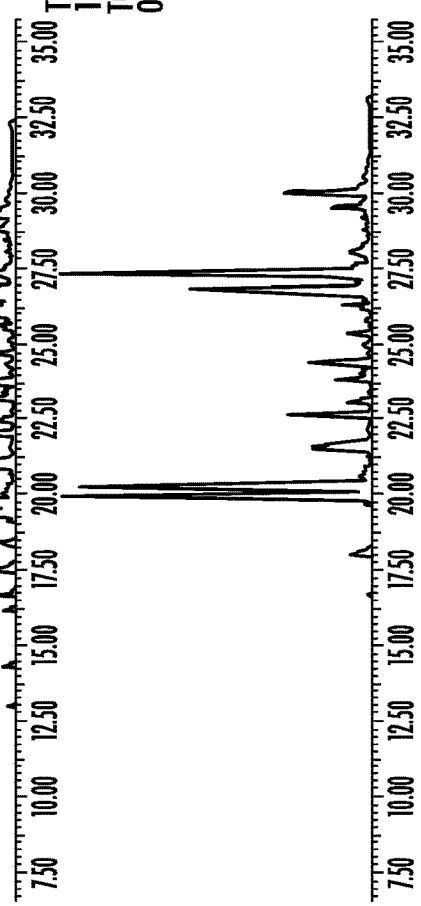
FIG. 9A
FIG. 9B
FIG. 9C

MATERIALS AND METHODS FOR TRAP-ELUTE MIXED MODE CHROMATOGRAPHY

CROSS-REFERENCE TO RELATED APPLICATIONS

This application claims the benefit of U.S. Provisional Application Ser. No. 62/696,694, entitled "MATERIALS AND METHODS FOR TRAP-ELUTE MIXED MODE CHROMATOGRAPHY," filed Jul. 11, 2018, which is incorporated herein by reference in its entirety.

FIELD

The present disclosure pertains to the field of liquid chromatography.

BACKGROUND

Mixed-mode chromatography refers to chromatographic methods that utilize more than one form of interaction between the stationary phase and analytes to achieve separation of the analytes. Mixed-mode chromatography is a promising technique for accessing novel separation selectivities. Because mixed-mode chromatography is inherently dependent on more than one retention mechanism, it can, however, be difficult to implement.

WO 2017/189357 to Lauber et al. and entitled "Charged Surface Reversed Phase Chromatographic Materials Method for Analysis of Glycans Modified with Amphipathic, Strongly Basic Moieties," which is hereby incorporated by reference in its entirety, describes the use of so-called charged surface reversed phase chromatographic materials for mixed-mode-like separations of glycans modified with amphipathic, strongly basic residues, wherein separation is achieved by exploiting the differences in hydrophobicity and charge characteristics that exist among glycans. The charged surface reversed phase sorbents applicable to these separations have been described in detail. In brief, a charged surface reversed phase material may be formed from a high purity chromatographic material (HPCM) having a chromatographic surface comprised of a hydrophobic surface group and one or more ionizable modifiers. In certain aspects, charged surface reversed phase materials have been described which have a ratio of hydrophobic surface group: ionizable modifier in the HPCM ranging from about 5:1 to about 22:1, a concentration of ionizable modifier less than about 0.5 $\mu mol/m^2$, and a C4 to C30 hydrophobic surface group. The use of such materials in which a chromatographic surface is produced by a diethylaminopropyl (DEAP) ionizable modifier, a C18 hydrophobic group and endcapping on a bridged ethylene hybrid particle has proven to be one exemplary embodiment for the separation of glycans labeled with amphipathic, strongly basic moieties, such as those labeled with RapiFluor-MS™ reagent, available from Waters Corporation, Milford, Mass., USA. This so-called diethylaminopropyl charged surface hybrid stationary phase material (DEAP HPCM) is highly effective in separating RapiFluor-MS™ reagent labeled glycans as a result of the glycans being modified with a relatively high pKa (~10) ionizable modifier that yields uniquely pronounced anionic retention.

Nanoscale liquid chromatography (nanoLC) enables the analysis of minimal sample quantities with comparatively higher mass spectrometric sensitivity versus higher flow rate chromatographic separations, such as those achieved with narrow bore (e.g., 2.1 mm ID) columns. With nanoLC, however, it is generally not reasonable to analyze large volume samples using just a single column. Instead, it is preferable to perform online trapping of analytes at microscale flow rates and to subsequently elute and separate those analytes across an analytical column, wherein a significantly lower nanoscale flow rate is employed. Often, tens of microliters of sample must be analyzed, and in these samples, analytes may be present at concentrations differing by more than several orders of magnitude. Performing trapping on a trap column amenable to high flow rates allows for greater throughput efficiency as well as desalting in a step that diverts unwanted solutes away from a downstream mass spectrometer without adding additional connections and tubing after the analytical column. A trap column can also function as a guard column to preserve the performance of the analytical column. Beyond its role as a guard column, an effective trapping column may be packed with larger diameter particles, typically ~5 µm, to enable higher velocity loading and retention of large, possibly dilute sample volumes.

SUMMARY

In various aspects, the present disclosure pertains to materials (e.g., kits, column assemblies, liquid chromatography systems, etc.) methods for performing liquid chromatography that employ a first column (e.g., a trapping column) and a second column (e.g., an analytical column). The first column comprises a first chromatographic material having a first chromatographic surface that comprises first hydrophobic surface groups and first ionizable surface groups having a first pKa value. The second column comprises a second chromatographic material having a second chromatographic surface that comprises second hydrophobic surface groups and (a) permanently ionized surface groups or (b) second ionizable surface groups having a second pKa value. The first hydrophobic surface groups have a hydrophobicity that is less than a hydrophobicity of the second hydrophobic surface groups. Moreover, where the second chromatographic surface comprises second ionizable surface groups, the first pKa value may differ from the second pKa value by 1-12 units, more typically 2 to 6 units.

In various embodiments, which can be used in conjunction with any of the preceding aspects, the first chromatographic material may be the form of first particles and the second chromatographic material may be in the form of second particles. In these embodiments, a first diameter of the first particles may be greater than equal to a second diameter of the second particles. For instance, a ratio of the first particle diameter to the second particle diameter may range from 1 to 10 (typically from 1.5 to 3), among other values. In these embodiments, the first diameter may range from 2 to 10 microns (typically, from 2.5 to 5 microns) and the second diameter may range from 1 to 5 microns (typically, from 1.5 to 3 microns), among other values.

In various embodiments, which can be used in conjunction with any of the above aspects and embodiments, the first chromatographic material may be in the form of first particles having a core of a first material and the second chromatographic material may be in the form of second particles having a core of a second material.

The first and second materials may be organic materials, inorganic materials, or organic-inorganic hybrid materials. The first and second materials may be selected, for example, from silica-based materials, alumina-based materials, titania-based materials, zirconia-based materials, carbon-based materials, and polymeric materials.

Where the first and second materials are silica-based materials, such materials formed by hydrolytically condensing one or more organosilane compounds. Examples of organosilane compounds include alkoxysilane compounds, for instance, tetraalkoxysilanes (e.g., tetramethoxysilane (TMOS), tetraethoxysilane (TEOS), etc.), alkylalkoxysilanes such as alkyltrialkoxysilanes (e.g., methyl trimethoxysilane, methyl triethoxysilane (MTOS), ethyl triethoxysilane, etc.) and bis(trialkoxysilyl)alkanes (e.g., bis(trimethoxysilyl)methane, bis(trimethoxysilyl)ethane, bis(triethoxysilyl)methane, bis(triethoxysilyl)ethane (BTEE), etc.), as well as combinations of the foregoing. In particular embodiments, the silica-based materials may be formed by hydrolytically condensing a tetraalkoxysilane (e.g., TMOS or TEOS) and an alkylalkoxysilane (e.g., MTOS or BTEE). Where the first and second materials are polymeric materials, the first and second materials may comprise a copolymer that includes a hydrophilic monomer (e.g., e.g., N-vinyl pyrrolidone, N-vinyl caprolactam, etc.) and a hydrophobic monomer (e.g., divinylbenzene, styrene, etc.).

In various embodiments, which can be used in conjunction with any of the above aspects and embodiments, the first column may have an internal diameter that is greater than or equal an internal diameter of the second column. For example, the first column may have an internal diameter that is 1-5 times (typically 1.5-3 times, more typically about 2 times) greater than an internal diameter of the second column, among other values. Moreover, the first column may have a length that is shorter than a length of the second column. In addition, a volume of the first column may range from 0.05-0.5 times (typically 0.1 to 0.3 times) a volume of the second column, among other values.

In various embodiments, which can be used in conjunction with any of the above aspects and embodiments, the first hydrophobic surface groups are first hydrocarbon groups consisting of carbon and hydrogen atoms and the second hydrophobic surface groups are second hydrocarbon groups consisting of carbon and hydrogen atoms. Examples of first and second hydrocarbon groups include (a) alkyl groups, (b) alkenyl groups, (c) alkynyl groups, (d) aromatic groups, or groups formed by any combination of groups (a), (b), (c) and (d). In general, the second hydrocarbon groups contain more carbon atoms than the first hydrocarbon surface groups. For example, the second hydrocarbon groups may contain 2-22 (more typically 4-14) more carbon atoms than the first hydrocarbon groups. In certain embodiments, the second hydrocarbon groups contain from 10 to 24 carbon atoms (16 to 20 carbon atoms, in particular embodiments) and the first hydrocarbon groups contain from 3 to 8 carbon atoms (4 carbon atoms, in particular embodiments).

In various embodiments, which can be used in conjunction with any of the above aspects and embodiments, the first ionizable groups are present in a surface concentration that is less than or equal to a surface concentration of the permanently ionized or second ionizable groups (e.g., the first ionizable groups may be present in a surface concentration that is 1-100%, more typically 15-50%, even more typically 20-30% of the surface concentration of the second ionizable groups). The first ionizable groups may be present in a surface concentration ranging from 0.03 to 0.3 micromoles per square meter (typically from 0.05 to 0.1, more typically, 0.06-0.08 micromoles per square meter, among other values).

In various embodiments, which can be used in conjunction with any of the above aspects and embodiments, the first ionizable groups as well as the permanently ionized or second ionizable groups are positively charged when ionized, in which case the ionizable groups or permanently ionized groups may comprise, for example, a positively charged nitrogen atom. In these embodiments, the first ionizable groups and the permanently ionized or second ionizable groups may comprise amine groups (including, for example, alkyl amine groups, aryl amine groups, imidazole groups, guanidinyl groups, amidino groups, quinolinyl groups, imine groups, and indole groups among others). In these embodiments, the first ionizable groups may comprise an amine group selected from primary, secondary and tertiary amine groups and the permanently ionized or second ionizable groups may comprise an amine group selected from primary, secondary, tertiary and quaternary amine groups. In embodiments where the second chromatographic surface comprises second ionizable surface groups, the first and second pKa values may be greater than 3, and the second pKa value may be 1-11 units greater (and typically 2-10 units greater) than the first pKa value. In certain embodiments, the first ionizable groups may be 4-pyridylethyl (4-PE), 2-pyridylethyl, 2-imidazolinylpropyl, 3-propylaniline, or imidazole groups. In certain embodiments, the second ionizable groups are diethylaminopropyl (DEAP), ethylaminopropyl, dimethylaminopropyl, methylaminopropyl, aminopropyl, diethylaminomethyl, 3-[Bis(2-hydroxyethyl)amino]propyl, n-butyl-aza-silacyclopentane, n-methyl-aza-silacyclopentane, or bis-3-methylaminopropyl silyl groups.

Alternatively, in various embodiments, which can be used in conjunction with any of the above aspects and embodiments, the first and second ionizable groups are negatively charged when ionized. For example, the first ionizable groups may be carboxylic acid groups and the second ionizable groups may be selected from sulfonic acid groups and carboxylic acid groups, among other possibilities. In embodiments, the second pKa value may be 1-4 units less than the first pKa value.

In various embodiments, which can be used in conjunction with any of the above aspects and embodiments, the molar ratio of the first hydrophobic surface groups to the first ionizable groups may range from 5:1 to 200:1.

In various aspects, the present disclosure pertains to kits that comprise a first column (e.g., a trapping column) in accordance with any of the above aspects and embodiments and a second column (e.g., an analytical column) in accordance with any of the above aspects and embodiments.

In some embodiments, the kit may further comprise a glycan labeling reagent. In certain of these embodiments, the glycan labeling reagent may be selected from an MS active, rapid fluorescence tagging compound, a procainamide reagent and a procaine reagent. In certain of these embodiments, glycans may be labeled using a glycan labeling reagent, which provides an amphipathic, basic moiety (a) having a pKa value greater than 7, greater than 8, or even greater than 9 and/or (b) having a Log P value between 0 and 5, typically a Log P value is between 1 and 5, more typically, Log P value is between 1 and 3. Specific examples of glycan labeling reagents for use in the present disclosure include RapiFluor-MS™ reagent, in which the glycan labeling reagent is

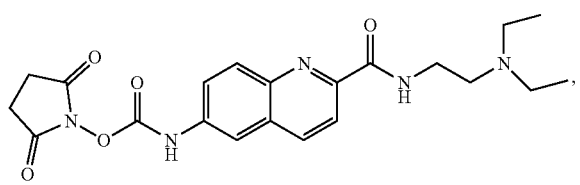 [SMILES: CCN(CC)CCNC(=O)c1ccc2cc(NC(=O)ON3C(=O)CCC3=O)ccc2n1]

available from Waters Corporation, Milford, Mass., USA, or InstantPC™ reagent, available from ProZyme Inc., Hayward, Calif. USA. Additional glycan labeling reagents are described in WO 2013/049622 to Brousmiche et al., which is hereby incorporated by reference in its entirety.

In various embodiments, which can be used in conjunction with any of the above aspects and embodiments, the kit may comprise one or more mobile phases for use with the first and/or second column. The one or more mobile phases may comprise an aqueous solution of an organic acid and/or an organic acid salt. Examples of organic acids include formic acid, difluoroacetic acid, trifluoroacetic acid, acetic acid, propionic acid, butyric acid, oxalic acid, malonic acid, succinic acid and maleic acid, among others and including organic hydroxyacids such as glycolic acid, lactic acid, tartaric acid, malic acid, citric acid and gluconic acid, among others. Examples of organic acid salts include salts having an organic acid anion, for instance, selected from formate, difluoroacetate, trifluoroacetate, acetate, propionate, butyrate, carbonate, bicarbonate, oxalate, malonate, succinate, maleate, glutarate, glycolate, lactate, malate, citrate and gluconate, among others, and a cation selected from a Group I metal cation, a Group II metal cation, an ammonium cation, and an amine cation). In particular embodiments, the one or more mobile phases comprise an aqueous solution of formic acid and ammonium formate.

In various aspects, the present disclosure pertains to column assemblies that comprise a first column (e.g., a trapping column) in accordance with any of the above aspects and embodiments and a second column (e.g., an analytical column) in accordance with any of the above aspects and embodiments. In addition, the column assemblies may further comprise a multi-way valve comprising first second and third ports, wherein the first column is connected to the multi-way valve via the first port, wherein the second column is connected to the multi-way valve via the second port. In a first multi-way valve position, the first port is in fluid communication with the second port (i.e., the first column is in fluid communication with the second column), but not the third port. In a second multi-way valve position, the first port is in fluid communication with the third port but not the second port (i.e., the first column is not in fluid communication with the second column). In certain embodiments, a waste line is connected to the multi-way valve via the third port. Also known in the art are vented column setups in which a switching valve is placed outside the sample stream, with the switching valve determining the path of flow.

In various aspects, the present disclosure pertains to liquid chromatography systems that comprise (a) a first column (e.g., a trapping column) in accordance with any of the above aspects and embodiments and (b) a second column (e.g., an analytical column) in accordance with any of the above aspects and embodiments. In addition, the liquid chromatography systems may further comprise (c) an injector configured to introduce a sample liquid into the system, (d) a detector configured to detect components (e.g., analytes) of the sample liquid, (e) a first flow path including the sample loop or flow through needle and the first column, but not the second column, (f) a second flow path including the first column and the second column, (g) a first pump configured to pump a first mobile phase along the first flow path, and (h) a second pump, which may be the same as or different from the first pump, configured to pump a second mobile phase along the second flow path. In some embodiments, the injector may comprise a sample loop. In some embodiments, the injector may comprise a flow through needle.

In various aspects, the present disclosure pertains to methods for performing liquid chromatography on a liquid sample including a plurality of components using liquid chromatography systems such as those described in the prior paragraph. In some embodiments, the methods comprise (a) introducing the liquid sample via the injector into the system; (b) flowing the first mobile phase through the first flow path using the first pump such that the liquid sample is guided through the first column and such that the first column traps at least a portion of the components of the liquid sample as trapped components; (c) flowing the second mobile phase through the second flow path using the second pump, wherein flowing through the second flow path includes flowing the second mobile phase (i) through the first column such that at least some of the trapped components are eluted from the first column as eluted components and (ii) through the second column such that at least some of the eluted components are separated as separated components; and flowing the separated components to the detector.

In various aspects, the present disclosure pertains to methods for performing liquid chromatography on a liquid sample including a plurality of components (e.g., analytes), which methods comprise (a) loading the liquid sample into an injector of a liquid chromatography system (e.g., an injector comprising a sample loop or flow through needle); (b) flowing a first mobile phase through a first flow path flow path in the system for liquid chromatography, wherein flowing through the first flow path includes flowing the first mobile phase through the injector (thereby picking up the sample) and a first column (e.g., a trapping column) in accordance with any of the above aspects and embodiments, wherein the first column traps at least some of the components of the liquid sample as trapped components; (c) flowing a second mobile phase through a second flow path in the system for liquid chromatography, wherein flowing through the second flow path includes flowing the second mobile phase through the first column to elute at least some of the trapped components from the first column as eluted components followed by flowing the second mobile phase and eluted components through a second column (e.g., an analytical column) in accordance with any of the above aspects and embodiments, wherein the second column separates at least some of the eluted components as separated components. In various embodiments, the method further comprises flowing the separated components to a detector that is configured to detect a property of the separated components.

In various embodiments, which can be used in conjunction with any of the above aspects and embodiments, the plurality of components in the sample liquid comprise glycans (which may vary in charge, including neutral glycans and positively charged glycans).

In various embodiments, which can be used in conjunction with any of the above aspects and embodiments, the plurality of components in the sample liquid comprises labeled glycans. In certain of these methods, glycans may be labeled using a glycan labeling reagent, which may be selected from a mass spectrometry (MS) active, rapid fluorescence tagging compound, a procainamide reagent and a procaine reagent. In certain of these methods, glycans may be labeled using a glycan labeling reagent, which provides an amphipathic, basic moiety (a) having a pKa value greater than 7, greater than 8, or even greater than 9 and/or (b) having a Log P value between 0 and 5, typically a Log P value is between 1 and 5, more typically, Log P value is between 1 and 3. Specific examples of glycan labeling reagents for use in the present disclosure include RapiFluor-MS™ reagent available from Waters Corporation, Milford, Mass., USA or InstantPC™ reagent, available from ProZyme Inc., Hayward, Calif. USA.

In various embodiments, which can be used in conjunction with any of the above aspects and embodiments, the first mobile phase may comprise water or an aqueous solution of an organic acid and/or an organic acid salt, examples of which are provided above.

In various embodiments, which can be used in conjunction with any of the above aspects and embodiments, the second mobile phase may comprise a solution of an organic acid and/or an organic acid salt, examples of which are provided above. In some of these embodiments, the second mobile phase comprises a solution of an organic acid and/or an organic acid salt in a solvent that comprises water and an organic solvent (methanol, ethanol, 1-propanol, 2-propanol, acetonitrile, acetone, ethyl acetate, methyl ethyl ketone, tetrahydrofuran and blends thereof). In some of these embodiments, the second mobile phase comprises an organic acid and an organic acid salt. In some of these embodiments, a course of elution for the second mobile phase is provided, during which a concentration of the organic acid is increased and a concentration of the organic acid salt is increased.

BRIEF DESCRIPTION OF THE DRAWINGS

FIG. 1B is a schematic illustration of a fluidic path for loading the trapping column. FIG. 1C is a schematic illustration of a fluidic path for eluting from the trapping column and developing a gradient across the analytical column.

FIGS. 8A-8C illustrate recovery from trap-elute chromatography as a function of the ammonium formate concentration used for the initial mobile phase/trapping condition. FIGS. 8A-8C show recoveries of three different classes of RapiFluor-MS™ reagent labeled, neutral N-glycans, provided in the form of observed fluorescence peak areas. A maximum value for fluorescence peak area is marked with a horizontal dashed line in FIGS. 8A-8C as estimated from fluorescence peak areas observed with a direct injection (no trapping) analysis as shown in FIG. 8D.

FIGS. 9A-9C illustrate trap-elute chromatography optimized for initial and final ammonium formate mobile phase concentrations. Separations of RapiFluor-MS™ reagent labeled glycans from pooled human IgG and bovine fetuin are shown. FIG. 9A is a fluorescence chromatogram obtained from direction injection (no trapping) with initial and final buffer concentrations of 0 and 22 mM ammonium formate/22 mM formic acid, respectively. FIG. 9B is a fluorescence chromatogram obtained from direction injection (no trapping) with initial and final buffer concentrations of 14 mM ammonium formate/14 mM formic acid and 22 mM ammonium formate/22 mM formic acid, respectively. FIG. 9C is a fluorescence chromatogram obtained from trap-elute chromatography using initial and final buffer concentrations of 14 mM ammonium formate/14 mM formic acid and 22 mM ammonium formate/22 mM formic acid, respectively.

DETAILED DESCRIPTION

Figure 1A:
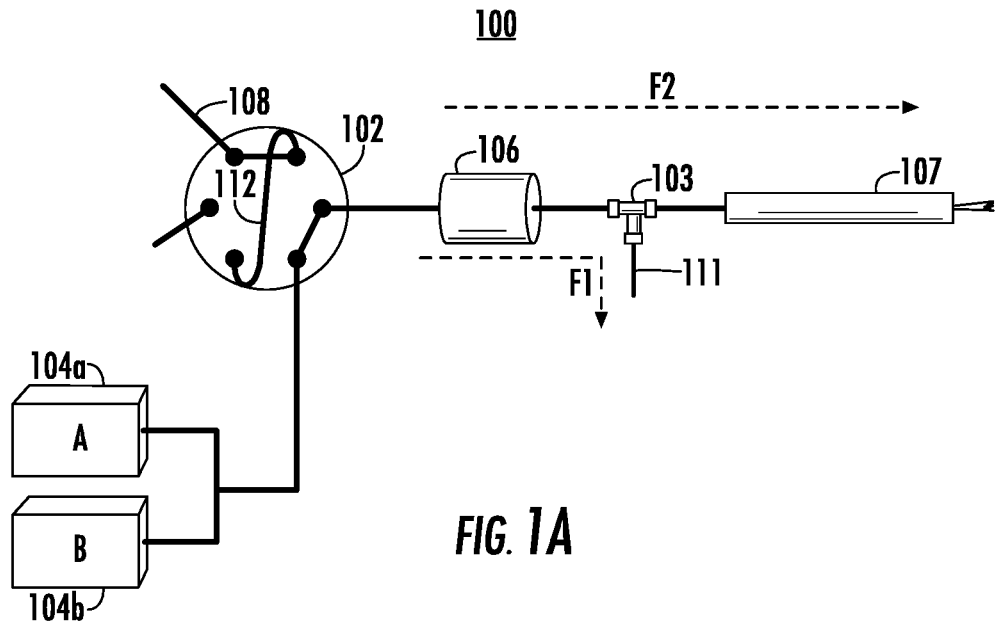
FIG. 1A is a schematic illustration of a liquid chromatography system, in accordance with the present disclosure.
Figure 1B:
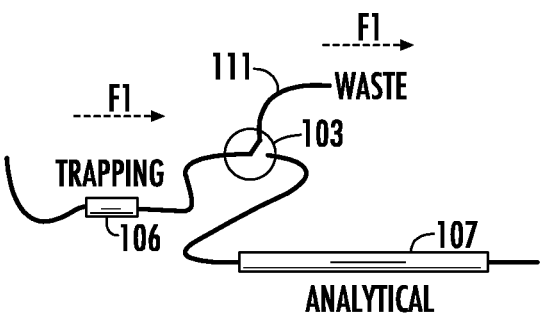
FIGS. 1B-1C illustrate two flow paths for a trap-elute chromatographic system comprising a trapping column and an analytical column, in accordance with the present disclosure.
Figure 1C:
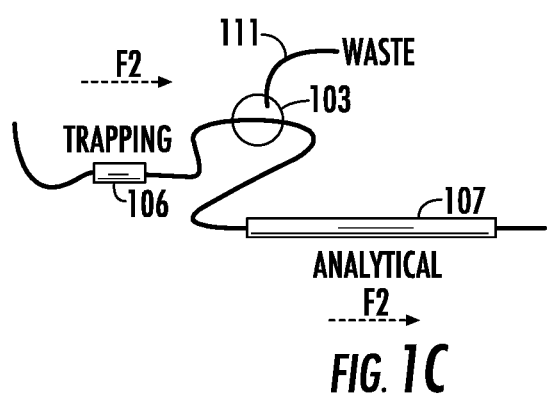

A system and method for performing trap-elute liquid chromatography on a liquid sample are schematically illustrated in FIGS. 1A-1C. Turning to FIG. 1A, a liquid chromatography system 100 is shown which includes (a) a trapping column 106 comprising a stationary phase material (described in further detail below), also referred to herein as a "trapping phase material," a "trapping phase" or a "first chromatographic material", (b) an analytical column 107 comprising a stationary phase material (described in further detail below), also referred to herein as an "analytical phase material," an "analytical phase" or a "second chromatographic material", (c) an injector including a sample loop 112 and a six-port injection valve 102 for receiving a liquid sample into the sample loop 112 (e.g., via a sampling attachment such as a sample needle 108), (d) a first flow path F1 including the trapping column 106 but not the analytical column 107, (e) a second flow path F2 including the trapping column 106 and the analytical column 107, (f) a first mobile phase delivery source (e.g., a first pump 104a is shown)

configured to pump a first mobile phase along the first flow path, and (g) a second mobile phase delivery source (e.g., a second pump 104b is shown) configured to pump a second mobile phase along the second flow path. A multi-port trap-elute valve (a three-port valve 103 is shown) is used to establish the first and second flow paths. (In other embodiments, a vented column setup may be employed.) Although not illustrated the liquid chromatography system 100 can also include one or more detectors which is/are configured to analyze separated sample components emerging from the analytical column, including detectors for performing mass spectrometry (MS). These include electrospray ionization mass spectrometry (ESI-MS), matrix-assisted laser desorption/ionization mass spectrometry (MALDI-MS), and time-of-flight mass spectrometry (TOFMS), nuclear magnetic resonance, infrared analysis, ultraviolet analysis, or a combination thereof, among others.

In a first step, and with particular reference as well to FIG. 1B, the method comprises introducing the liquid sample via the injector, flowing the first mobile phase through the first flow path F1 (indicated with dashed arrows) using the first pump 104a such that the liquid sample is guided through the trapping column 106 and such that the trapping column 106 traps at least a portion of the components of the liquid sample as trapped components. During this first step, the multi-port trap-elute valve 103 may be set to a first position such that the first mobile phase emerging from the trapping column 106 is routed to a waste line 111. After this first step, and with particular reference as well to FIG. 1C, the second mobile phase is flowed through the second flow path F2 (indicated with dashed arrows) using the second pump 104b, wherein flowing through the second flow path F2 includes flowing the second mobile phase (a) through the trapping column 106 such that at least some of the trapped components are eluted from the trapping column 106 as eluted components and (b) through the analytical column 107 such that at least some of the eluted components are separated as separated components. The separated eluted components may then be subjected to further analysis as desired. During this first step, the multi-port trap-elute valve 103 may be set to a second position such that the second mobile phase emerging from the trapping column 106 is routed to the analytical column 107.

Although first and second pumps 104a, 104b are described in conjunction with FIGS. 1A-1C, in other embodiments, a single pump can be used to pump the mobile phases.

Additional details will now be described in conjunction with the liquid chromatography system 100 shown in FIG. 2A. The system 100 shown includes a six-port injection valve 102, which is connected to a mobile phase delivery source 104. In the embodiment shown, the mobile phase delivery source 104 is a micro binary solvent manager (µBSM) system available from Waters Corporation, which is capable of delivering up to four solvents in various combinations of two solvents. The mobile phase delivery source 104 delivers mobile phase liquids through selected internal fluid pathways of the six-port injection valve 102. A trapping column 106 and an analytical column 107, separated by a trap-elute valve 103, are also connected to the six-port injection valve 102. As previously indicated, trapping column 106 and analytical column 107 act in concert with the mobile phases to accomplish trapping and separation of the various sample components introduced into the system.

Also connected to the six-port injection valve 102 is a sampling attachment, in this embodiment, a sample needle 108. The sample needle 108 may be inserted into a sample container (not shown) for the purpose of in-taking an aliquot of a sample solution contained within the sample container. Sample needle 108 is the entry point of the sample solution into a sample uptake or aspiration path leading to the sample loop 112 of injection valve 102. A syringe 110 is connected to six-port injection valve 102. The syringe 110 interacts cooperatively with injection valve 102 to control the uptake or aspiration of sample through sample needle 108, typically by causing a prescribed volumetric displacement of sample liquid within sample needle 108. Sample loop 112 residing in fluid communication with the six-port injection valve 102 has an upstream loop end 112u and a downstream loop end 112d. When the six-port injection valve 102 is in a sample intake configuration, the syringe 110 is in fluid communication with the upstream loop end 112u of the external sample loop 112, while sample needle 108 is in fluid communication with the downstream loop end 112d. In this illustrative configuration, sample may be aspirated from a sample container into sample loop 112 through the action of syringe 110.

When six-port injection valve 102 is transitioned to a trap/elute configuration, on the other hand, the pattern of fluid communication internal to the valve 112 is changed, redirecting the fluid flow. With injection valve 102 in the trap/elute configuration, mobile phase delivery source 104 is in fluid communication with the upstream loop end 112u of sample loop 112, while trapping column 106 is in fluid communication with the downstream end 112d of sample loop 112. Also, when injection valve 102 in the trap/elute configuration, downstream end 112d of sample loop 112 is in fluid communication, via port 6 and line 113, with the upstream end 106u of trapping column 106. Consequently, when the injection valve 102 in the trap/elute configuration, the mobile phase flow sourced from mobile phase delivery source 104 propels any sample solution contained within sample loop 112 through line 113 and into trapping column 106.

Downstream of the trapping column 106 is a trap-elute valve 103. Although the valve 103 shown is a six-port valve, it is effectively a three-port valve in the embodiment shown as three of the ports are plugged with pin plugs 109. Thus, a simple three-way valve having three ports and two flow patterns (e.g., at T-shaped valve as shown in FIG. 1A) may also be employed as a trap-elute valve 103. The downstream end of the trapping column is connected to a port of the trap-elute valve 103 at port 1 as shown. Port 2 of the trap-elute valve 103 is attached to waste line 111 and port 6 is connected to the trapping column 107. In the trapping position of trap-elute valve 103, the downstream end 106d of trapping column 106 is in fluid communication with waste line 111, thereby providing a first flow path for the mobile phase.

With the trap-elute valve 103 in the elution position, on the other hand, the downstream end 106d of trapping column 106 is in fluid communication with an upstream end 107u of the analytical column 107, thereby providing a second flow path for the mobile phase. In this position, the mobile phase flow sourced from mobile phase delivery source 104 propels sample contained within the trapping column 106 from the trapping column 106 and through the analytical column 107.

Figure 2A:
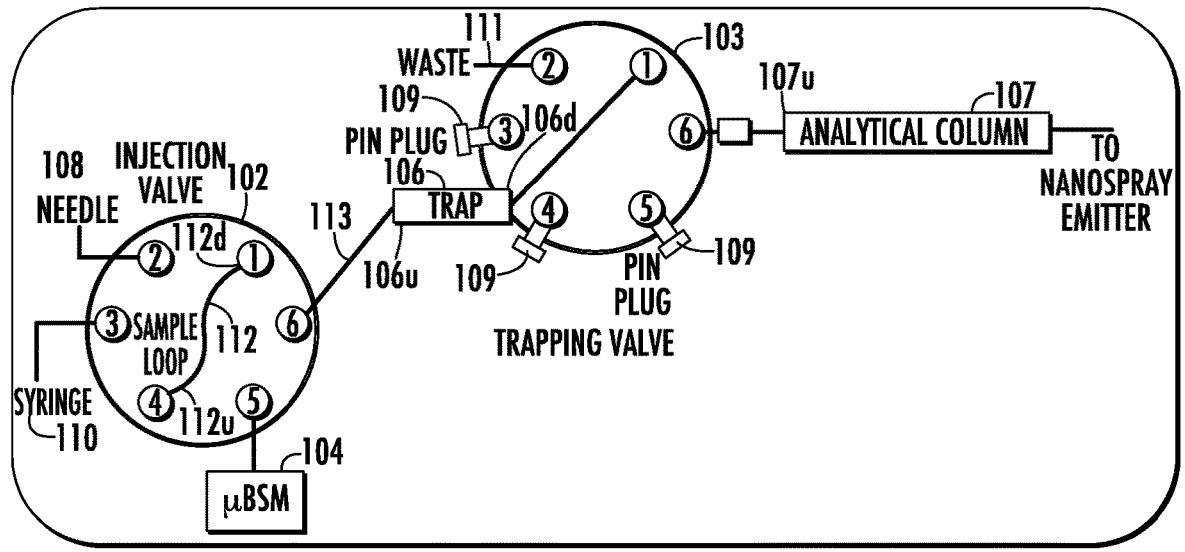
FIG. 2A is a schematic illustration of a trap-elute chromatographic system that comprises a trapping column and an analytical column, in accordance with an embodiment of the present disclosure.
Figure 2B:
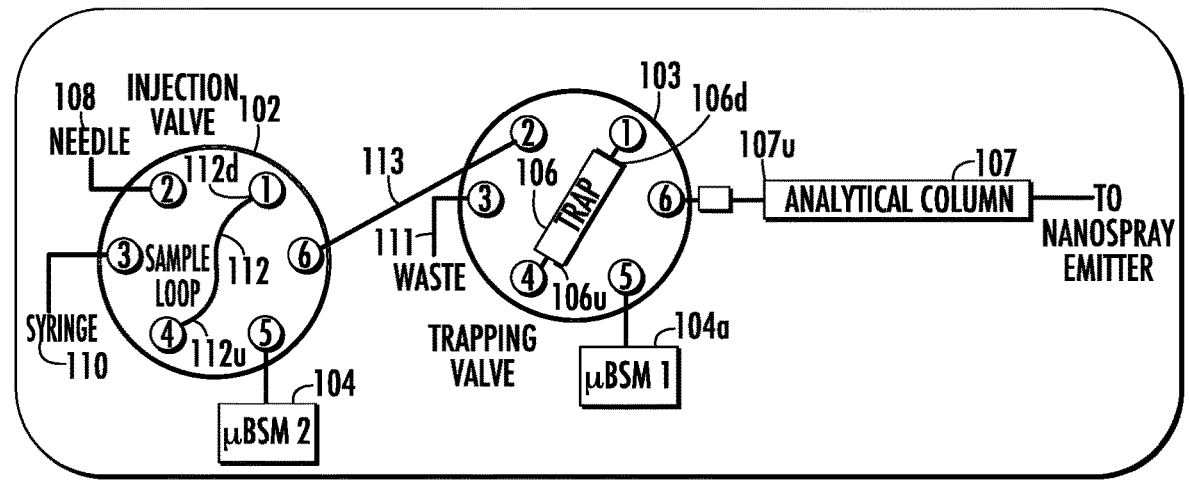
FIG. 2B is a schematic illustration of a trap-elute chromatographic system that comprises a trapping column and an analytical column, in accordance with another embodiment of the present disclosure.

An alternative embodiment of a liquid chromatography system 100 shown in accordance with the present disclosure is shown in FIG. 2B. As can be seen by comparing FIGS. 2A and 2B, the system 100 differs in that it includes an additional mobile phase delivery source 104a in fluid communication with port 5, the trap-elute valve 103 is a six-port valve with no ports plugged, line 113 is in fluid communication with port 2 of the trap-elute valve 103 (rather than the upstream end 106u of trapping column 106), waste line 111 is in fluid communication with port 3 of the trap-elute valve 103, and the trap column is in fluid connection with ports 1 and 4 of the trap-elute valve 103.

As in FIG. 2A, when six-port injection valve 102 is in a sample intake configuration, syringe 110 is in fluid communication with the upstream loop end 112u of external sample loop 112, while sample needle 108 is in fluid communication with the downstream loop end 112d of the external sample loop 112, allowing sample to be aspirated from a sample container into sample loop 112 through the action of syringe 110. Also analogous to FIG. 2A, when the six-port injection valve 102 is transitioned to a trapping configuration, the mobile phase flow sourced from mobile phase delivery source 104 propels any sample solution contained within sample loop 112 into line 113.

The six-port trap-elute valve 103 can be placed in multiple configurations including a trapping configuration and an eluting configuration. When six-port trap-elute valve 103 is in a trapping configuration, upstream end 106u of the trap column 106 is in fluid communication with line 113, thereby allowing the sample solution to be received from the six-port injection valve 102 (when injection valve 102 is in the trapping configuration), while the downstream end 106d of trap column 106 is in fluid communication with the waste line 111. Thus, in the trapping position of trap-elute valve 103, a first flow path for the mobile phase is created that extends from the mobile phase delivery source 104, through sample loop 112, through line 113, through trap column 106, and into waste line 111.

When the six-port trap-elute valve 103 is in an eluting configuration, on the other hand, the upstream end 106u of trap column 106 is in fluid communication with the additional mobile phase delivery source 104a, while the downstream end 106d of trap column 106 is in fluid communication with the upstream end 107u of the analytical column 107. Thus, in the eluting position of trap-elute valve 103, a second flow path for the mobile phase is created that extends from the additional mobile phase delivery source 104a, through trap column 106, and through analytical column 107.

Having described embodiments of trap-elute liquid chromatography systems 100 and their operation, the use of such systems for mixed-mode trap-elute chromatography will now be described. To present inventors' knowledge, systems and techniques for trap-elute chromatography with mixed-mode separation have not yet been developed. Understandably, the development of a given trap-elute mixed-mode chromatography system is not trivial, since there are multiple retention mechanisms to consider when looking to match the properties of a trapping phase to those of a selected mixed-mode analytical phase. In the disclosure to follow, optimal chromatographic materials and methods for use with mixed-mode trap-elute chromatography are described.

In general, the trapping column that is employed in the present disclosure is selected to have a lower retentivity when compared to the analytical column. This relationship between trapping and analytical column retentivity during gradient elution ensures refocusing of analytes on to the analytical column, thereby delivering high peak capacity separations to any downstream detector.

In developing suitable trapping phase and analytical phase materials, the present inventors have analyzed the relative retentivity of the trapping phase versus the analytical phase to establish optimized trap-elute chromatography systems. Screening experiments involving a one-dimensional separation on various stationary phases can consequently be used to evaluate the potential utility of a trapping phase for use with a given analytical phase. That is, the suitability of a trapping phase can be assessed by comparing its retention profile to the retention profile of the intended analytical phase. In the particular embodiments to follow, the analytic phase that is employed is a DEAP HPCM material as described in WO 2017/189357 to Lauber et al.

As noted above, WO 2017/189357 to Lauber et al. describe the use of a so-called diethylaminopropyl charged surface hybrid stationary phase material (DEAP HPCM) described therein for the separation of glycans labeled with amphipathic, strongly basic moieties, such as the labeling reagent RapiFluor-MS™ reagent, available form Waters Corporation, Milford, Mass., USA and described, for example, in WO 2013/049622 to Brousmiche et al. and in Matthew A. Lauber et al., "Rapid Preparation of Released N-Glycans for HILIC Analysis Using a Labeling Reagent that Facilitates Sensitive Fluorescence and ESI-MS Detection," *Anal. Chem.* 2015, 87, 5401-5409. DEAP HPCM has previously been shown to be highly effective in separating RapiFluor-MS™ labeled glycans as a result of the glycans being modified with a relatively high pKa (~10) ionizable modifier that yields uniquely pronounced anionic retention.

Figure 3:
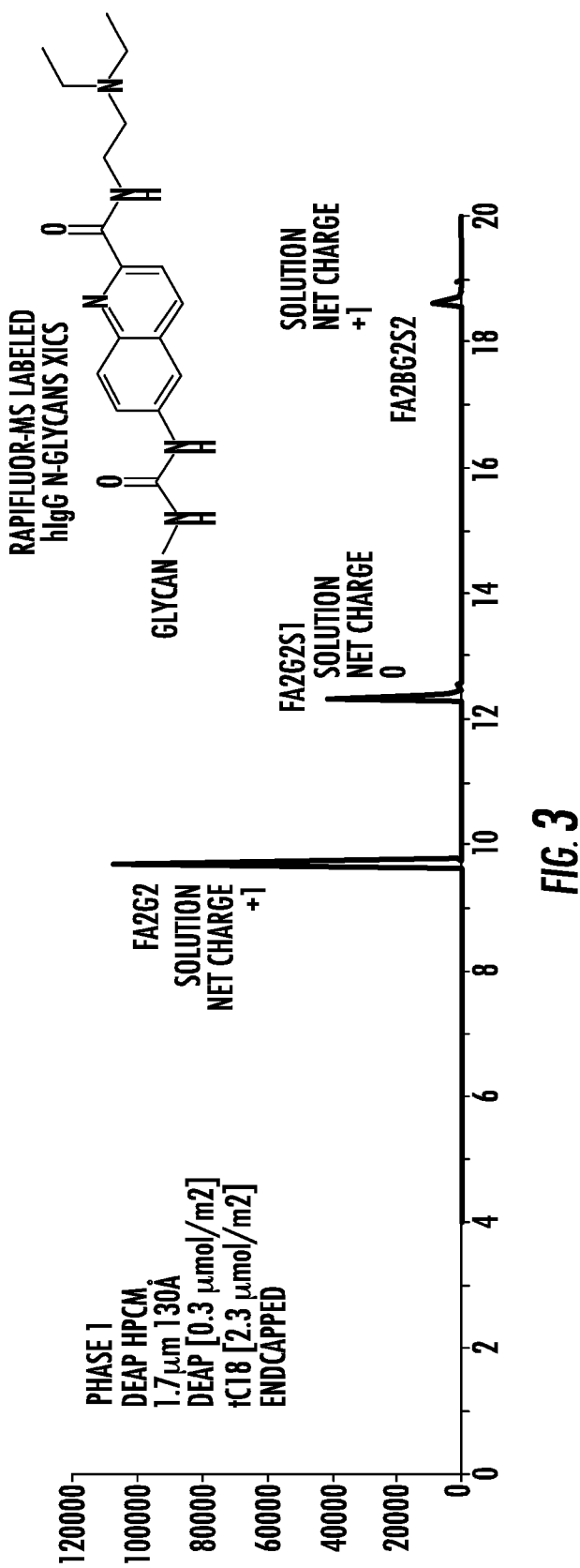
FIG. 3 is a chromatogram showing mixed-mode retentivity of a stationary phase (DEAP HPCM 130 Å 1.7 μm). The approximate net charges of each species as they exist in the mobile phase conditions are noted.
Figure 4:
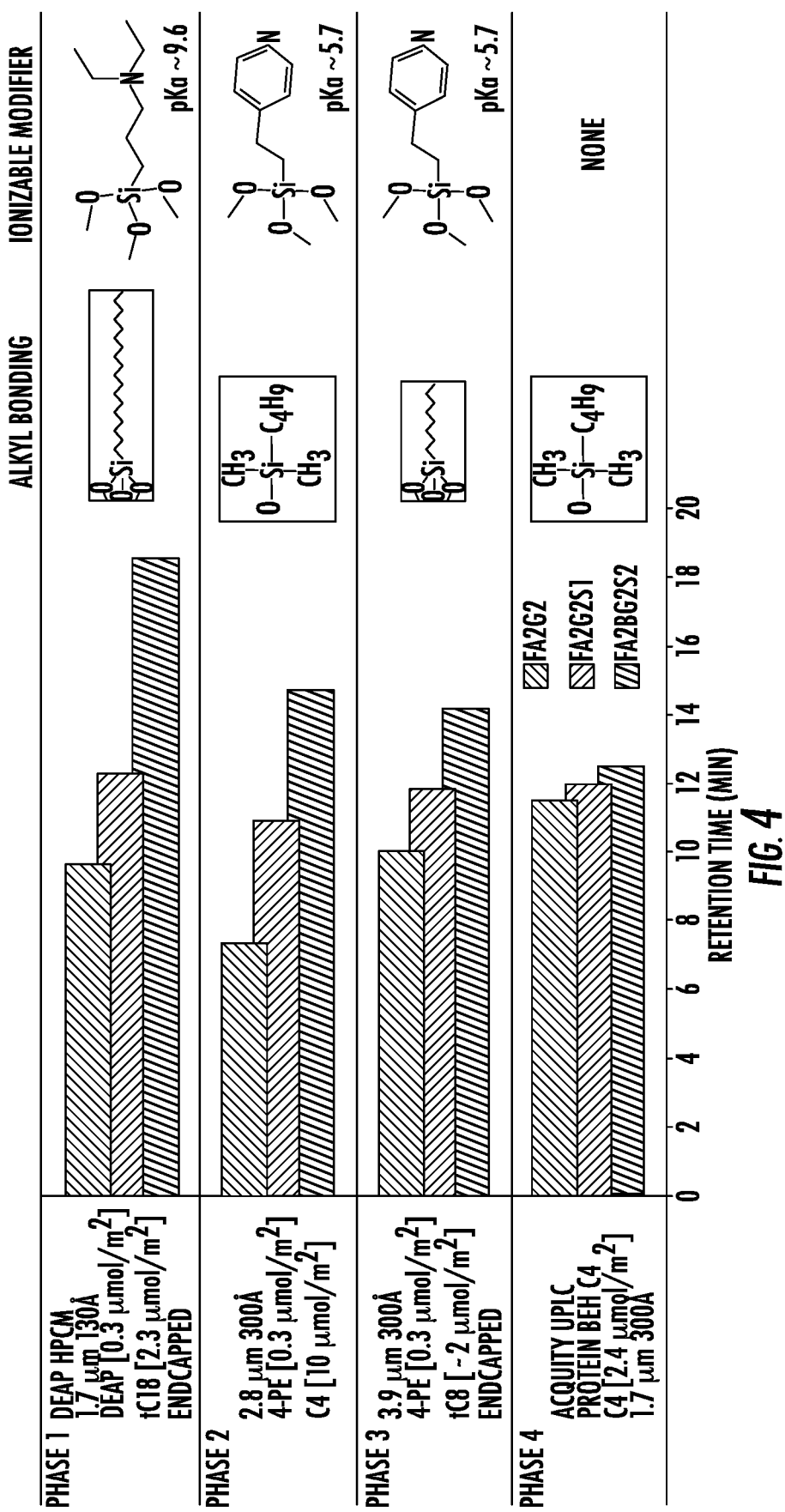
FIG. 4 illustrates mixed-mode retentivity of four phases differing in their surface charge and alkyl chain length. Retention times of neutral, monosialylated and disialylated RapiFluor-MS™ reagent labeled glycans are shown (DEAP=diethylaminopropyl, tC18=trifunctional C18, 4-PE=4-pyridylethyl, tC8=trifunctional C8).
Figure 5:
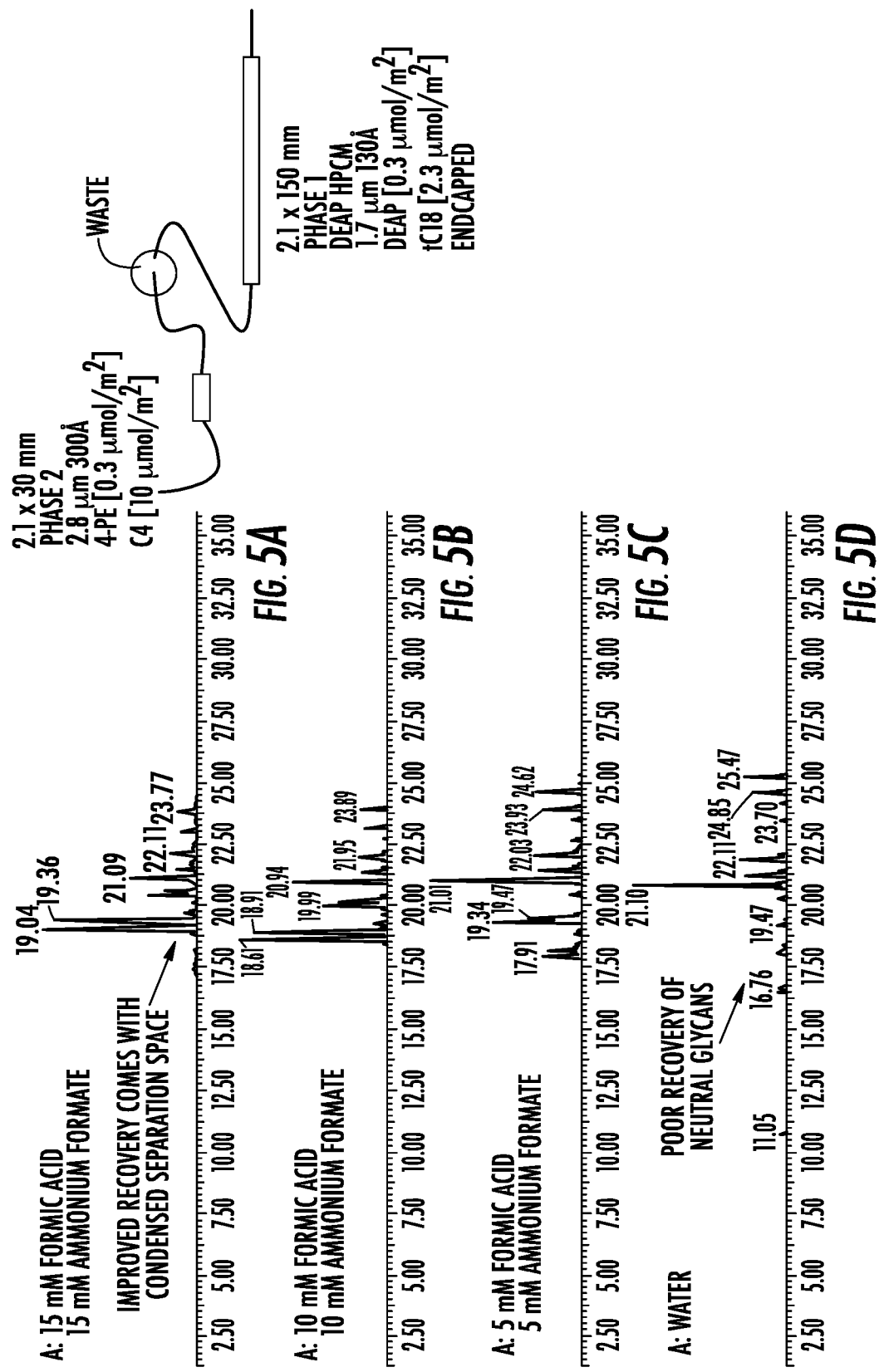
FIGS. 5A-5D illustrate trap-elute chromatography utilizing trapping with phase 2 combined with analytical chromatography with phase 1. Fluorescence chromatograms of RapiFluor-MS™ reagent labeled human IgG glycans as obtained with varying concentrations of ammonium formate for initial mobile phase conditions are shown.

Procedures associated with the generation of FIGS. 3-9C are described in detail in the Examples below. Turning to FIG. 3, a representation of the retention profile for a DEAP HPCM stationary phase is shown in the form of extracted ion chromatograms for neutral (net charge=+1) (designated FA2G2), monosialylated (net charge=0) (designated FA2G2S1) and disialylated (net charge=−1) (designated FA2G2) RapiFluor-MS™ labeled N-glycan species. The retention times of the three noted species provide an indication of the retentivity and selectivity of the stationary phase. As shown with the plot of FIG. 4, DEAP HPCM (Phase 1) was found to have a relatively high average retentivity, as a result of its long, C18 hydrophobic bonding, yet it also exhibited high selectivity (i.e., difference in retention between differentially charged species) by virtue of its high pKa ionizable modifier (i.e., the diethylaminopropyl ionizable modifier) and comparatively strong anion exchange properties.

An ideal trapping phase for DEAP HPCM would be one with very minimally reduced retention for each class (charge state) of analyte. In pursuit of such, the present inventors examined the retention profiles of three potential trapping phases, each of which had a unique combination of alkyl bonding and ionizable modifier, specifically, C4 alkyl bonding in combination with a 4-pyridylethyl (4-PE) ionizable group (Phase 2 in FIG. 3), C8 alkyl bonding in combination with a 4-PE ionizable group (Phase 3 in FIG. 3), and C4 alkyl bonding in combination with no ionizable group (Phase 4 in FIG. 3). It had been hypothesized that a shorter alkyl bonding would be a viable route to finding a suitable trapping. However, as can be seen with the results for Phase 4, an alkyl C4 bonding without any ionizable modifier produced a suboptimal retention profile, in particular, a retentivity that was too strong for species with a positive in-solution net charge (FA2G2). As a result, the inventors investigated varying the surface potential of the trapping phase as well. So as to not create any mixed-mode selectivity that would be greater than the DEAP HPCM analytical phase, a lower pKa ionizable modifier (4-pyridylethyl, 4-PE) was then investigated. Interestingly, the retention profile of a phase that combines a C8 alkyl bonding with a 4-PE ionizable modifier (Phase 3) proved to be quite similar to DEAP HPCM, yet Phase 3 still exhibited retentivity that was higher than desired for certain species, such as FA2G2, that have positive in-solution net charges. In contrast, a phase based on C4 alkyl bonding paired with the weaker pKa 4-PE modifier (Phase 2) gave a near ideal retention profile for each analyte class. These data demonstrate that an optimal material for trapping can be produced for a given mixed-mode analytical stationary phase through attenuating retentivity and mixed-mode selectivity.

Based on the above screening experiments, a Phase 2 trapping column was selected for use in a trap-elute configuration along with a DEAP HPCM (Phase 1) analytical column (FIGS. 5A-5D). Methods for optimizing the separation of RapiFluor-MS™ labeled human IgG N-glycans were explored, first starting with use of conditions previously found to give an exemplary direct injection separation with a DEAP HPCM column. This particular method entails the use of a 100% water initial mobile phase composition, which is also what defines the trapping mobile phase composition for the trap-elute configuration. FIG. 5D displays the chromatogram obtained with trapping onto Phase 2 using such a method. Notably, the chromatographic profile was found to be missing glycan structures that bear positive net charges (RapiFluor-MS™ reagent labeled, neutral N-glycans). The present inventors had previously found that a significant effect on the retention of these species is related to charge repulsion. Accordingly, the ionic strength of the initial mobile phase composition was increased, and, in turn, the recovery of the species with a positive net charge state was dramatically improved (FIGS. 5A-5C). The use of the ≥15 mM ammonium formate/15 mM formic acid initial mobile phase composition was not found to be sufficient, however, to effectively retain the least hydrophobic glycan species (e.g., mannose 5). Moreover, the use of higher buffer concentrations at the initial conditions of the gradient led to undesirably reduced anion exchange selectivity.

Figure 6:
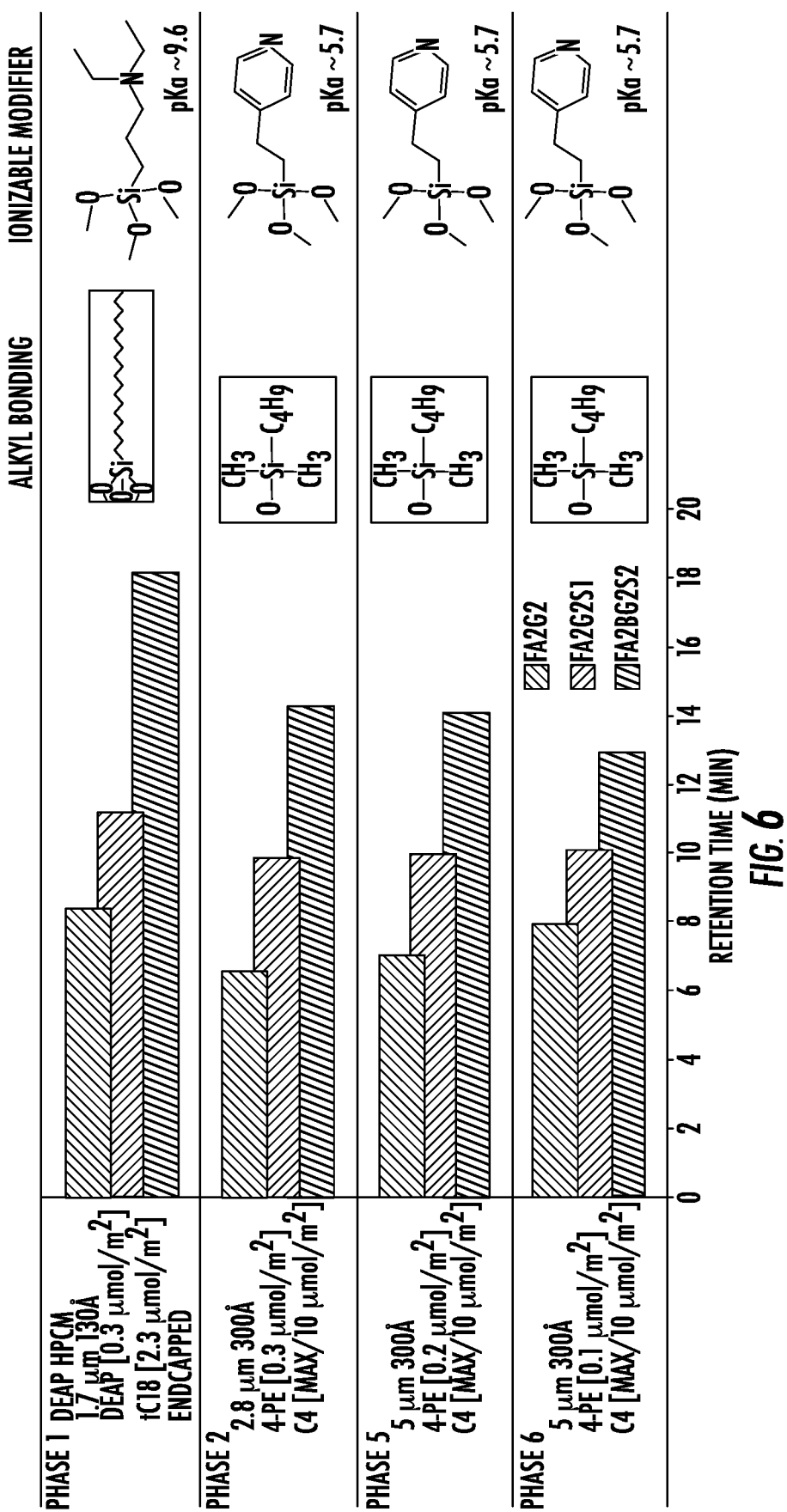
FIG. 6 illustrates mixed-mode retentivity of four phases differing in their alkyl chain length, ionizable modifier, and coverage of ionizable modifier. Retention times of neutral, monosialylated and disialylated RapiFluor-MS™ reagent labeled glycans are shown (DEAP=diethylaminopropyl, tC18=trifunctional C18, 4-PE=4-pyridylethyl).
Figures 7A, 7B, 7C:
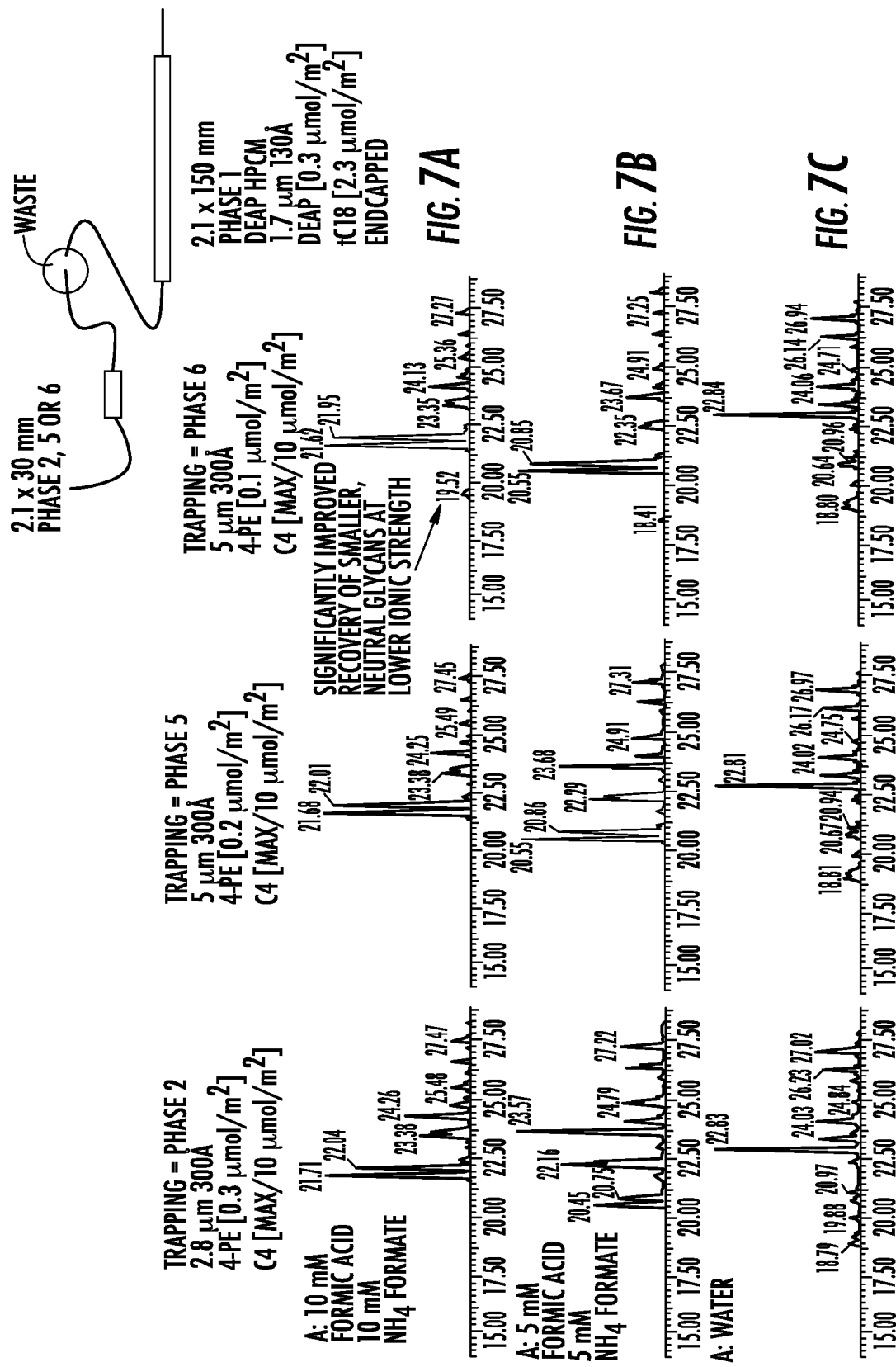
FIGS. 7A-7C illustrate trap-elute chromatography utilizing trapping with three different phases combined with analytical chromatography with Phase 1. Fluorescence chromatograms of RapiFluor-MS™ reagent labeled human IgG glycans as obtained with varying concentrations of ammonium formate for initial mobile phase conditions are shown.

To further modulate retentivity, coverage of the 4-PE was varied from approximately 0.3 $\mu mol/m^2$ (Phase 2) to 0.2 $\mu mol/m^2$ (Phase 5) and 0.1 $\mu mol/m^2$ (Phase 6). The retentivities for each, as well as that of Phase 1 is shown in FIG. 6. Phase 5 and Phase 6 each showed advantageous increases in the retentivity of the probe for RapiFluor-MS™ reagent labeled, neutral glycan species (FA2G2). Moreover, their performance in a trap-elute configuration was found to be quite promising as shown in FIG. 7. In particular, Phase 6 appeared to give dramatically improved recoveries of the least hydrophobic, neutral N-glycans and to be less dependent on initial mobile phase composition. To view this quantitatively, we analyzed the peak area of the most weakly retained glycan species as a function of trapping phase and initial mobile phase composition. FIGS. 8A-8C display these data along with values marked for the peak areas of the noted glycan species as observed with a direct injection experiment. Indeed, Phase 6 proved to be the most suitable trapping phase, given that it showed recoveries for the most weakly retained species in the profile even with methods that used low buffer concentrations for the initial mobile phase composition.

The combination of Phase 6 trapping and DEAP HPCM analytical columns was further subjected to method optimization. Through adjusting the ionic strength gradient, the trap-elute method was found to be capable of producing resolution comparable to that of a direct injection separation. FIGS. 9A-9C display exemplary results for this trap-elute mixed-mode chromatography alongside comparative examples of the separations as obtained with a direct injection LC configuration.

There has been a need in the art for methods that can facilitate trap-elute chromatography of a mixed-mode separation. This present disclosure addresses the challenges that exist in creating a trapping phase with properties that optimally match those of a selected mixed-mode analytical phase, namely reduced retentivity, yet similar mixed-mode selectivity, for different classes of relevant analyte types. A select few of these analytes include the acidic metabolites of the Kreb's cycle (including but not limited to citrate, isocitrate, ketoglutarate, succinate, fumarate, malate, and oxaloacetate), oligonucleotides, glyophosate and its related derivatization analogs, as well as peptides and glycans.

It has also been discovered that a trapping material with appropriately attenuated retentivity and mixed-mode selectivity can be prepared by using a weaker (i.e. lower pKa base/high pKa acid) ionizable modifier and a shorter hydrophobic alkyl group, as compared to the intended analytical phase. In one embodiment, an ionizable modifier for the trapping phase is chosen that has a pKa differing by at least 1 unit from the pKa for the ionizable modifier of the analytical phase, more ideally a pKa differing by at least 2 units. In this same embodiment, the hydrophobic surface group is selected for the trapping phase that is comprised of fewer carbon atoms as compared to the analytical phase, generally at least 2 fewer carbons, more ideally at least 4 fewer carbons, and preferentially at least 6 fewer carbons.

In addition, it has been discovered that a material can be made more effective for trapping by modulating its coverage of ionizable modifier. In one embodiment, the ionizable modifier has a coverage of less than 0.3 $\mu mol/m^2$, yet more ideally less than 0.2 $\mu mol/m^2$, and further still less than or equal to 0.1 $\mu mol/m^2$.

Furthermore, this disclosure prescribes the use of solutions having ionic strength as a means to improve the trapping recoveries of analytes during scenarios in which charge repulsion is encountered. Accordingly, in yet another embodiment of this disclosure, the noted trapping materials can be used with initial mobile phase total buffer concentrations greater than 0 mM, more ideally greater than 1 mM, yet typically less than 40 mM so as to not constrict the available mixed-mode selectivity too significantly.

Additional aspects of the present disclosure will now be described in the following enumerated aspects:

Aspect A1. A liquid chromatography system comprising: a trapping column comprising a first chromatographic material having a first chromatographic surface that comprises first hydrophobic surface groups and first ionizable surface groups having a first pKa value, an analytical column comprising a second chromatographic material having a second chromatographic surface that comprises second hydrophobic surface groups having a hydrophobicity that is greater than a hydrophobicity of the first hydrophobic surface groups and (i) permanently ionized surface groups or (ii) second ionizable surface groups having a second pKa value that differs from the first pKa value by 1-12 units, an injector for introducing a liquid sample into the system, a detector capable of detecting a property of the components, a first flow path including the injector and the trapping column but not the analytical column, a second flow path including the trapping column and the analytical column, and one or more mobile phase delivery sources configured to pump a first mobile phase along the first flow path and to pump a second mobile phase along the second flow path.

Aspect A2. The liquid chromatography system of Aspect A1, wherein the one or more mobile phase delivery sources comprise a first pump that is configured to pump the first mobile phase along the first flow path, and a second pump, which may be the same as or different from the first pump, that is configured to pump the second mobile phase along the second flow path.

Aspect A3. The liquid chromatography system of any of Aspects A1-A2, wherein the first chromatographic material is in the form of first particles and wherein the second chromatographic material is in the form of second particles.

Aspect A4. The liquid chromatography system of Aspect A3, wherein a first diameter of the first particles is greater than equal to a second diameter of the second particles.

Aspect A5. The liquid chromatography system of Aspect A4, wherein a ratio of the first particle diameter to the second particle diameter ranges from 1 to 10.

Aspect A6. The liquid chromatography system of any of Aspects A4-A5, wherein the first diameter ranges from 2 to 10 microns.

Aspect A7. The liquid chromatography system of any of Aspects A1-A6, wherein the trapping column has an internal diameter that is greater than or equal an internal diameter of the analytical column and wherein the trapping column has a length that is shorter than a length of the analytical column.

Aspect A8. The liquid chromatography system of any of Aspects A1-A7, wherein the trapping column has an internal diameter that is 1.5-5 times greater than an internal diameter of the analytical column.

Aspect A9. The liquid chromatography system of any of Aspects A1-A8, wherein a volume of the trapping column ranges from 0.05-0.5 times a volume of the analytical column.

Aspect A10. The liquid chromatography system of any of Aspects A1-A9, wherein the first and second hydrophobic surface groups are hydrocarbon groups, and wherein the second hydrophobic surface groups contain more carbon atoms than the first hydrophobic surface groups.

Aspect A11. The liquid chromatography system of Aspect A10, wherein the second hydrocarbon groups contain 2-20 more carbon atoms than the first hydrocarbon groups Aspect A12. The liquid chromatography system of any of Aspects A10-A11, wherein the first hydrocarbon groups are first alky groups that contain from 3 to 8 carbon atoms and wherein the second hydrocarbon groups are second alkyl groups that contain from 10 to 24 carbon atoms.

Aspect A13. The liquid chromatography system of Aspect A12, wherein the first alky groups contain 4 carbon atoms and wherein the second groups contain 18 carbon atoms.

Aspect A14. The liquid chromatography system of any of Aspects A1-A13, wherein the first ionizable groups are present in a surface concentration that is less than or equal to a surface concentration of the permanently ionized or second ionizable groups Aspect A15. The liquid chromatography system of any of Aspects A1-A14, wherein the first ionizable groups are present in a surface concentration ranging from 0.03 to 0.3 micromoles per square meter.

Aspect A16. The liquid chromatography system of any of Aspects A1-A15, wherein the first ionizable groups and the permanently ionized or second ionizable groups are positively charged when ionized.

Aspect A17. The liquid chromatography system of Aspect A16, wherein the second chromatographic surface comprises the second ionizable surface groups, wherein the first and second pKa values are greater than 3, and wherein the second pKa value is 1-7 units greater than the first pKa value.

Aspect A18. The liquid chromatography system of any of Aspects A1-A17, wherein (a) the first ionizable groups and (b) the permanently ionized or second ionizable groups comprise amine groups.

Aspect A19. The liquid chromatography system of any of Aspect A18, wherein the first ionizable groups are selected from primary, secondary and tertiary amine groups and the permanently ionized or second ionizable groups are selected from secondary, tertiary and quaternary amine groups.

Aspect A20. The liquid chromatography system of any of Aspects A1-A17, wherein the first ionizable groups are selected from 4-pyridylethyl, 2-pyridylethyl, 2 imidazolinylpropropyl, 3-propylaniline or imidazole groups.

Aspect A21. The liquid chromatography system of any of Aspects A1-A18, wherein the second ionizable groups are selected from diethylaminopropyl, ethylaminopropyl, dimethylaminopropyl, methylaminopropyl, aminopropyl, diethylaminomethyl, 3-[Bis(2-hydroxyethyl)amino]propyl, n-butyl-aza-silacyclopentane, n-methyl-aza-silacyclopentane, or bis-3-methylaminopropyl silyl groups.

Aspect A22. The liquid chromatography system of any of Aspects A1-A21 wherein, the molar ratio of the first hydrophobic surface groups to the first ionizable groups ranges from 5:1 to 200:1.

Aspect A23. The liquid chromatography system of any of Aspects A1-A15, wherein the first and second ionizable groups are negatively charged when ionized.

Aspect A24. The liquid chromatography system of Aspect A23, wherein the first ionizable groups are carboxylic acid groups and the second ionizable groups are selected from sulfonic acid groups and carboxylic acid groups.

Aspect A25. The liquid chromatography system of any of Aspects A23-A24, wherein the second pKa value is 1-4 units less than the first pKa value.

Aspect A26. The liquid chromatography system of any of Aspects A1-A25, wherein the first chromatographic material is in the form of first particles having a core of a first material and wherein the second chromatographic material is in the form of second particles having a core of a second material.

Aspect A27. The liquid chromatography system of Aspect A26, wherein the first and second materials are organic materials, inorganic materials, or organic-inorganic hybrid materials.

Aspect A28. The liquid chromatography system of Aspect A26, wherein the first and second materials are selected from silica-based materials, alumina-based materials, titania-based materials, zirconia-based materials, and carbon-based materials.

Aspect A29. The liquid chromatography system of Aspect A26, wherein the first and second materials are silica-based materials formed by hydrolytically condensing one or more organosilane compounds.

Aspect A30. The liquid chromatography system of Aspect A29, wherein the organosilane compounds comprise one or more alkoxysilane compounds.

Aspect A31. The liquid chromatography system of Aspect A29, wherein the organosilane compounds are prepared from a tetraalkoxysilane and an alkylalkoxysilane.

Aspect A32. The liquid chromatography system of Aspect A26, wherein the first and second materials comprise an organic polymer.

Aspect A33. The liquid chromatography system of any of Aspects A1-A32, wherein the injector comprises a sample loop or a flow through needle.

Aspect A34. A method for performing liquid chromatography on a liquid sample including a plurality of components using the liquid chromatography system of any of Aspects A1-33, the method comprising: introducing the liquid sample into the system via the injector; flowing the first mobile phase through the first flow path using the one or more mobile phase delivery sources such that the liquid sample is guided through the trapping column and such that the trapping column traps at least a portion of the components of the liquid sample as trapped components; flowing the second mobile phase through the second flow path using the one or more mobile phase delivery sources one or more mobile phase delivery sources, wherein flowing through the second flow path includes flowing the second mobile phase (a) through the trapping column such that at least some of the trapped components are eluted from the trapping column as eluted components and (b) through the analytical column such that at least some of the eluted components are separated as separated components; and flowing the separated eluted components to the detector.

Aspect A35. The method of Aspect A34, wherein the components comprise glycans.

Aspect A36. The method of Aspect A34, wherein the components comprises labeled glycans.

Aspect A37. The method of Aspect A36, wherein labeled glycans are labeled with a labeling reagent selected from an MS active, rapid fluorescence tagging compound; a procainamide reagent; or a procaine reagent.

Aspect A38. The method of any of Aspects A36-A37, wherein the labeled glycans are labeled with a glycan labeling reagent that provides an amphipathic, strongly basic moiety having a pKa value greater than 6.

Aspect A39. The method of any of Aspects A34-A38, wherein the first mobile phase comprises (i) water or (ii) an aqueous solution of a first organic acid and/or a first organic acid salt.

Aspect A40. The method of Aspect A39, wherein the second mobile phase comprises a solution of a second organic acid, which may be the same of different from the first organic acid, and/or a second organic acid salt, which may be the same of different from the first organic acid salt Aspect A41. The method of any of Aspects A34-A38, wherein the first mobile phase comprises a solution of an organic acid and an organic acid salt in a solvent that comprises water and an organic solvent, and wherein the second mobile phase comprises a course of elution during which a concentration of the organic acid is increased and a concentration of the organic acid salt is increased.

Aspect B1. A chromatography column comprising chromatographic particles comprising a core and a chromatographic surface that comprises hydrophobic surface groups comprising from 3-8 carbon atoms and ionizable surface groups having a pKa value ranging from 3 to 8, wherein the ionizable groups are present in a surface concentration ranging from 0.03 to 0.3 micromoles per square meter.

Aspect B2. The chromatography column of Aspect B1, wherein the ionizable groups are selected from 4-pyridylethyl, 2-pyridylethyl, 2-imidazolinylpropropyl, 3-propylaniline or imidazole groups.

Aspect B3. The chromatography column of any of Aspects B1-B2 wherein the molar ratio of the first hydrophobic surface groups to the ionizable groups ranges from 5:1 to 200:1.

Aspect B4. The chromatography column of any of Aspects B1-B3, wherein the core is selected from an organic material, inorganic material, or organic-inorganic hybrid material.

Aspect B5. The chromatography column of any of Aspects B1-B3, wherein the core is selected from silica-based material, an alumina-based material, a titania-based material, a zirconia-based material, and a carbon-based material.

Aspect B6. The chromatography column of any of Aspects B1-B3, wherein the core is a silica-based material formed by hydrolytically condensing one or more organosilane compounds.

Aspect B7. The chromatography column of Aspect B6, wherein the organosilane compounds comprise one or more alkoxysilane compounds.

Aspect B8. The chromatography column of Aspect B6, wherein the organosilane compounds are prepared from a tetraalkoxysilane and an alkylalkoxysilane.

Aspect C1. A kit comprising: (a) a trapping column comprising a first chromatographic material having a first chromatographic surface that comprises first hydrophobic surface groups and first ionizable surface groups having a first pKa value and (b) an analytical column comprising a second chromatographic material having a second chromatographic surface that comprises second hydrophobic surface groups having a hydrophobicity that is greater than a hydrophobicity of the first hydrophobic surface groups and (i) permanently ionized surface groups or (ii) second ionizable surface groups having a second pKa value that differs from the first pKa value by 1-12 units.

Aspect C2. The kit of Aspect C1, wherein the first chromatographic material is in the form of first particles and wherein the second chromatographic material is in the form of second particles.

Aspect C3. The kit of Aspect C2, wherein a first diameter of the first particles is greater than equal to a second diameter of the second particles.

Aspect C4. The kit of Aspect C3, wherein a ratio of the first particle diameter to the second particle diameter ranges from 1 to 10.

Aspect C5. The kit of any of Aspects C3-C4, wherein the first diameter ranges from 2 to 10 microns.

Aspect C6. The kit of any of Aspects C1-05, wherein the trapping column has an internal diameter that is greater than or equal an internal diameter of the analytical column and wherein the trapping column has a length that is shorter than a length of the analytical column.

Aspect C7. The kit of any of Aspects C1-C6, wherein the trapping column has an internal diameter that is 1.5-5 times greater than an internal diameter of the analytical column.

Aspect C8. The kit of any of Aspects C1-C7, wherein a volume of the trapping column ranges from 0.05-0.5 times a volume of the analytical column.

Aspect C9. The kit of any of Aspects C1-C8, wherein the first and second hydrophobic surface groups are hydrocarbon groups, and wherein the second hydrophobic surface groups contain more carbon atoms than the first hydrophobic surface groups.

Aspect C10. The kit of Aspect C9, wherein the second hydrocarbon groups contain 2-20 more carbon atoms than the first hydrocarbon groups Aspect C11. The kit of any of Aspects C9-C10, wherein the first hydrocarbon groups are first alky groups that contain from 3 to 8 carbon atoms and wherein the second hydrocarbon groups are second alkyl groups that contain from 10 to 24 carbon atoms.

Aspect C12. The kit of Aspect C11, wherein the first alky groups contain 4 carbon atoms and wherein the second groups contain 18 carbon atoms.

Aspect C13. The kit of any of Aspects C1-C12, wherein the first ionizable groups are present in a surface concentration that is less than or equal to a surface concentration of the permanently ionized or second ionizable groups Aspect C14. The kit of any of Aspects C1-C13, wherein the first ionizable groups are present in a surface concentration ranging from 0.03 to 0.3 micromoles per square meter.

Aspect C15. The kit of any of Aspects C1-C14, wherein the first ionizable groups and the permanently ionized or second ionizable groups are positively charged when ionized.

Aspect C16. The kit of Aspect C15, wherein the second chromatographic surface comprises the second ionizable surface groups, wherein the first and second pKa values are greater than 3, and wherein the second pKa value is 1-7 units greater than the first pKa value.

Aspect C17. The kit of any of Aspects C1-C16, wherein (a) the first ionizable groups and (b) the permanently ionized or second ionizable groups comprise amine groups.

Aspect C18. The kit of any of Aspect C17, wherein the first ionizable groups are selected from primary, secondary and tertiary amine groups and the permanently ionized or second ionizable groups are selected from primary, secondary, tertiary and quaternary amine groups.

Aspect C19. The kit of any of Aspects C1-C16, wherein the first ionizable groups are selected from 4-pyridylethyl, 2-pyridylethyl, 2 imidazolinylpropryl 2 imidazolinylpropropyl, 3-propylaniline or imidazole groups.

Aspect C20. The kit of any of Aspects C1-C17, wherein the second ionizable groups are selected from diethylaminopropyl, ethylaminopropyl, dimethylaminopropyl, methylaminopropyl, aminopropyl, diethylaminomethyl, 3-[Bis(2-hydroxyethyl)amino]propyl, n-butyl-aza-silacyclopentane, n-methyl-aza-silacyclopentane, or bis-3-methylaminopropyl silyl groups.

Aspect C21. The kit of any of Aspects C1-C20 wherein, the molar ratio of the first hydrophobic surface groups to the first ionizable groups ranges from 5:1 to 200:1.

Aspect C22. The kit of any of Aspects C15-C21, wherein the kit comprises a glycan labeling reagent Aspect C23. The kit of Aspect C22, wherein the glycan labeling reagent is selected from an MS active, rapid fluorescence tagging compound, a procainamide reagent, or a procaine reagent.

Aspect C24. The kit of any of Aspects C22-C23, wherein glycan labeling reagent provides an amphipathic, strongly basic moiety having a pKa value greater than 6.

Aspect C25. The kit of any of Aspects C1-C14, wherein the first and second ionizable groups are negatively charged when ionized.

Aspect C26. The kit of Aspect C25, wherein the first ionizable groups are carboxylic acid groups and the second ionizable groups are selected from sulfonic acid groups and carboxylic acid groups.

Aspect C27. The kit of any of Aspects C25-C26, wherein the second pKa value is 1-4 units less than the first pKa value.

Aspect C28. The kit of any of Aspects C1-C27, wherein the kit further comprises an eluent.

Aspect C29. The kit of any of Aspects C1-C28, wherein the first chromatographic material is in the form of first particles having a core of a first material and wherein the second chromatographic material is in the form of second particles having a core of a second material.

Aspect C30. The kit of Aspect C29, wherein the first and second materials are organic materials, inorganic materials, or organic-inorganic hybrid materials.

Aspect C31. The kit of Aspect C29, wherein the first and second materials are selected from silica-based materials, alumina-based materials, titania-based materials, zirconia-based materials, and carbon-based materials.

Aspect C32. The kit of Aspect C29, wherein the first and second materials are silica-based materials formed by hydrolytically condensing one or more organosilane compounds.

Aspect C33. The kit of Aspect C32, wherein the organosilane compounds comprise one or more alkoxysilane compounds.

Aspect C34. The kit of Aspect C32, wherein the organosilane compounds are prepared from a tetraalkoxysilane and an alkylalkoxysilane.

Aspect C35. The kit of Aspect C29, wherein the first and second materials comprise an organic polymer.

Aspect D1. A method for performing liquid chromatography on a liquid sample, the method comprising: loading a liquid sample including a plurality of components into a first flow path in a liquid chromatography system; flowing a first mobile phase through the first flow path such that the liquid sample is guided through a trapping column, wherein the trapping column comprises a first chromatographic material having a first chromatographic surface that comprises first hydrophobic surface groups and first ionizable surface groups having a first pKa value and wherein the trapping column traps at least some of the components of the liquid sample as trapped components; and flowing a second mobile phase through a second flow path in the system for liquid chromatography, wherein flowing through the second flow path includes flowing the second mobile phase through the trapping column to elute at least some of the trapped components from the trapping column as eluted components and flowing the second mobile phase and eluted components through an analytical column capable of separating at least some of the eluted components as separated components, wherein the analytical column comprises a second chromatographic material having a second chromatographic surface that comprises second hydrophobic surface groups having a hydrophobicity that is greater than a hydrophobicity of the first hydrophobic surface groups and (i) permanently ionized surface groups or (ii) second ionizable surface groups having a second pKa value that differs from the first pKa value by 1-12 units.

Aspect D2. The method of Aspect D1, further comprises flowing the separated components to a detector capable of detecting a property of the separated components.

Aspect D3. The method of any of Aspects D1-2, wherein the first chromatographic material is in the form of first particles and wherein the second chromatographic material is in the form of second particles.

Aspect D4. The method of Aspect D3, wherein a first diameter of the first particles is greater than equal to a second diameter of the second particles.

Aspect D5. The method of Aspect D4, wherein a ratio of the first particle diameter to the second particle diameter ranges from 1 to 10.

Aspect D6. The method of any of Aspects D4-5, wherein the first diameter ranges from 2 to 10 microns.

Aspect D7. The method of any of Aspects D1-6, wherein the trapping column has an internal diameter that is greater than or equal an internal diameter of the analytical column and wherein the trapping column has a length that is shorter than a length of the analytical column.

Aspect D8. The method of any of Aspects D1-D7, wherein the trapping column has an internal diameter that is 1.5-5 times greater than an internal diameter of the analytical column.

Aspect D9. The method of any of Aspects D1-D8, wherein a volume of the trapping column ranges from 0.05-0.5 times a volume of the analytical column.

Aspect D10. The method of any of Aspects D1-D9, wherein the first and second hydrophobic surface groups are hydrocarbon groups, and wherein the second hydrophobic surface groups contain more carbon atoms than the first hydrophobic surface groups.

Aspect D11. The method of Aspect D10, wherein the second hydrocarbon groups contain 2-20 more carbon atoms than the first hydrocarbon groups Aspect D12. The method of any of Aspects D10-D11, wherein the first hydrocarbon groups are first alky groups that contain from 3 to 8 carbon atoms and wherein the second hydrocarbon groups are second alkyl groups that contain from 10 to 24 carbon atoms.

Aspect D13. The method of Aspect D12, wherein the first alky groups contain 4 carbon atoms and wherein the second groups contain 18 carbon atoms.

Aspect D14. The method of any of Aspects D1-D13, wherein the first ionizable groups are present in a surface concentration that is less than or equal to a surface concentration of the permanently ionized or second ionizable groups Aspect D15. The method of any of Aspects D1-D14, wherein the first ionizable groups are present in a surface concentration ranging from 0.03 to 0.3 micromoles per square meter.

Aspect D16. The method of any of Aspects D1-D15, wherein the first ionizable groups and the permanently ionized or second ionizable groups are positively charged when ionized.

Aspect D17. The method of Aspect D16, wherein the second chromatographic surface comprises the second ionizable surface groups, wherein the first and second pKa values are greater than 3, and wherein the second pKa value is 1-7 units greater than the first pKa value.

Aspect D18. The method of any of Aspects D1-D17, wherein (a) the first ionizable groups and (b) the permanently ionized or second ionizable groups comprise amine groups.

Aspect D19. The method of any of Aspect D18, wherein the first ionizable groups are selected from primary, secondary and tertiary amine groups and the permanently ionized or second ionizable groups are selected from secondary, tertiary and quaternary amine groups.

Aspect D20. The method of any of Aspects D1-D17, wherein the first ionizable groups are selected from 4-pyridylethyl, 2-pyridylethyl, 2 imidazolinylpropropyl, 3-propylaniline or imidazole groups.

Aspect D21. The method of any of Aspects D1-D18, wherein the second ionizable groups are selected from diethylaminopropyl, ethylaminopropyl, dimethylaminopropyl, methylaminopropyl, aminopropyl, diethylaminomethyl, 3-[Bis(2-hydroxyethyl)amino]propyl, n-butyl-aza-silacyclopentane, n-methyl-aza-silacyclopentane, or bis-3-methylaminopropyl silyl groups.

Aspect D22. The method of any of Aspects D1-D21 wherein, the molar ratio of the first hydrophobic surface groups to the first ionizable groups ranges from 5:1 to 200:1.

Aspect D23. The method of any of Aspects D1-D15, wherein the first and second ionizable groups are negatively charged when ionized.

Aspect D24. The method of Aspect D23, wherein the first ionizable groups are carboxylic acid groups and the second ionizable groups are selected from sulfonic acid groups and carboxylic acid groups.

Aspect D25. The method of any of Aspects D23-D24, wherein the second pKa value is 1-4 units less than the first pKa value.

Aspect D26. The method of any of Aspects D1-D25, wherein the first chromatographic material is in the form of first particles having a core of a first material and wherein the second chromatographic material is in the form of second particles having a core of a second material.

Aspect D27. The method of Aspect D26, wherein the first and second materials are organic materials, inorganic materials, or organic-inorganic hybrid materials.

Aspect D28. The method of Aspect D26, wherein the first and second materials are selected from silica-based materials, alumina-based materials, titania-based materials, zirconia-based materials, and carbon-based materials.

Aspect D29. The method of Aspect D26, wherein the first and second materials are silica-based materials formed by hydrolytically condensing one or more organosilane compounds.

Aspect D30. The method of Aspect D29, wherein the organosilane compounds comprise one or more alkoxysilane compounds.

Aspect D31. The method of Aspect D29, wherein the organosilane compounds are prepared from a tetraalkoxysilane and an alkylalkoxysilane.

Aspect D32. The method of Aspect D26, wherein the first and second materials comprise an organic polymer.

Aspect D33. The method of any of Aspects D1-D32, wherein the components comprise glycans.

Aspect D34. The method of any of Aspects D1-D32, wherein the components comprises labeled glycans.

Aspect D35. The method of Aspect D34, wherein glycan is labeled with a labeling reagent selected from an MS active, rapid fluorescence tagging compound; a procainamide reagent; or a procaine reagent.

Aspect D36. The method of any of Aspects D34-D35, wherein the glycan is labeled with a glycan labeling reagent that provides an amphipathic, strongly basic moiety having a pKa value greater than 6.

Aspect D37. The method of any of Aspects D1-D36, wherein the first mobile phase comprises (i) water or (ii) an aqueous solution of a first organic acid and/or a first organic acid salt.

Aspect D38. The method of Aspect D37, wherein the second mobile phase comprises a solution of a second organic acid, which may be the same of different from the first organic acid, and/or a second organic acid salt, which may be the same of different from the first organic acid salt Aspect D39. The method of any of Aspects D1-D36, wherein the first mobile phase comprises a solution of an organic acid and an organic acid salt in a solvent that comprises water and an organic solvent, and wherein the second mobile phase comprises a course of elution during which a concentration of the organic acid is increased and a concentration of the organic acid salt is increased.

EXAMPLES

Materials

Unless otherwise noted, all reagents described in the procedures below were used as received. Those skilled in the art will recognize that equivalents exist, as such, although supplies and suppliers are listed, the listed supplies/suppliers should in no way be construed as limiting.

Characterization

Stationary phases resulting from the procedures were characterized in the following manner. The % C values were measured by a Coulometric Carbon Analyzer (modules CM5300, CM5014, UIC Inc., Joliet, Ill.). The specific surface areas (SSA), specific pore volumes (SPV) and the average pore diameters (APD) of these materials were measured using the multi-point N2 sorption method (Micromeritics ASAP 2400; Micromeritics Instruments Inc., Norcross, Ga.). The SSA was calculated using the BET method, the SPV was the single point value determined for $P/P_0>0.98$ and the APD was calculated from the desorption leg of the isotherm using the BJH method. Particle sizes were measured using a Beckman Coulter Multisizer 3 analyzer (30 μm aperture, 70,000 counts; Miami, Fla.). The particle diameter (dp) was measured as the 50% cumulative diameter of the volume based particle size distribution. Total surface coverages of the alkyl hydrophobic groups were determined by the difference in particle % C before and after the surface modification as measured by elemental analysis. Those skilled in the art will recognize that equivalents of the instruments listed above exist and, as such, the instruments listed below are not to be construed as limiting.

Example 1

Synthesis of a DEAP HPCM Stationary Phase

DEAP HPCM stationary phases (Phase 1) were synthesized according to the following procedure:

Step 1: BEH porous particles (Waters Corporation, Milford, Mass.; 6.5% C; SSA=75-200 m²/g; SPV=0.60-0.75 cc/g; APD=115-310 Å) of the formula $(O_{1.5}SiCH_2CH_2SiO_{1.5})(SiO_2)_4$ (prepared following the method described in U.S. Pat. No. 6,686,035) were refluxed in toluene (5 mL/g, Fisher Scientific, Fairlawn, N.J.) using a Dean-Stark trap for 1 hour. Upon cooling, redistilled (N,N-Diethylaminopropyl)trimethoxysilane (DEAP, Silar Laboratories, Wilmington, N.C.) at 0.3 μmol/m² was added and the reaction was heated to reflux for 2 hrs. The reaction was then cooled and the product was filtered and washed successively with toluene, 1:1 v/v acetone/water, and acetone (all solvents from Fisher Scientific, Fairlawn, N.J.). The product was then dried at 80° C. under reduced pressure for 16 hrs.

Step 2: Material from Step 1 was refluxed in toluene (5 mL/g, Fisher Scientific, Fairlawn, N.J.) using a Dean-Stark trap for 1 hour. Upon cooling, imidazole (Aldrich, Milwaukee, Wis.) and octadecyltrichlorosilane (Gelest Inc., Morrisville, Pa.) at 2.3 μmol/m² were added and the reaction was heated to reflux for 16 hrs. The reaction was then cooled and the product was filtered and washed successively with toluene, 1:1 v/v acetone/water, and acetone (all solvents from Fisher Scientific, Fairlawn, N.J.). The material was then refluxed in acetone/aqueous 0.1 M ammonium bicarbonate (pH 10) solution for 20 hours at 50° C. (hydrolysis). Following hydrolysis, the material was washed successively with 1:1 v/v acetone/water, and acetone (all solvents from Fisher Scientific, Fairlawn, N.J.). The product was then dried at 80° C. under reduced pressure for 16 hours.

Step 3: Material from Step 2 was refluxed in toluene (5 mL/g, Fisher Scientific, Fairlawn, N.J.) using a Dean-Stark trap for 1 hour. Upon cooling, imidazole (Aldrich, Milwaukee, Wis.) and triethylchlorosilane (TECS, Gelest Inc., Morrisville, Pa.) were added and the reaction was heated to reflux for 4 hrs. The reaction was then cooled and, imidazole and trimetylchlorosilane (Aldrich, Milwaukee, Wis.) were added to the reaction and the reaction was heated to reflux for an additional 16 hrs. The reaction was then cooled and the product was filtered and washed successively with toluene, 1:1 v/v acetone/water, and acetone (all solvents from Fisher Scientific, Fairlawn, N.J.). The product was then dried at 80° C. under reduced pressure for 16 hrs.

Information related to the DEAP HPCM phase, Phase 1, can be found below:

| Base Particle | Material |
|---|---|
| B1 | Hybrid Organic Silica (1.7 μm, 130 Å APD, 185 m²/g SSA)[1] |

[1]As described in U.S. Pat. No. 7,919,177, U.S. Pat. No. 7,223,473, U.S. Pat. No. 6,686,035

| Example | Base Material Particle | DEAP Charge (μmol/m²) | $C_{18}$ Coverage (μmol/m²) |
|---|---|---|---|
| Phase 1 | B1 | 0.3 | 2.4 |

Example 2

Synthesis of HPCMs with Ionizable Modifiers and Alkyl Hydrophobic Groups

Step 1: BEH porous particles (Waters Corporation, Milford, Mass.; 6.5% C; SSA=75-200 m²/g; SPV=0.60-0.75 cc/g; APD=115-310 Å) of the formula $(O_{1.5}SiCH_2CH_2SiO_{1.5})(SiO_2)_4$ (prepared following the method described in U.S. Pat. No. 6,686,035) were refluxed in toluene (5 mL/g, Fisher Scientific, Fairlawn, N.J.) using a Dean-Stark trap for 1 hour. Upon cooling, 2-(4-pyridylethyl)triethoxysilane (4PE, Gelest Incorporated, Morrisville, Pa.) at 0.1-0.3 μmol/m² was added and the reaction was heated to reflux for 1 hour. The reaction was then cooled and, imidazole and Component A silane additive were added, which included t-butyldimethylchlorosilane or octyltrichlorosilane (C8, Aldrich, St. Louis, Mo.). The reaction was then heated to reflux for 20 hrs. The reaction was cooled and the product was filtered and washed successively with toluene, 1:1 v/v acetone/water, and acetone (all solvents from Fisher Scientific, Fairlawn, N.J.). The material was then refluxed in acetone/aqueous 0.1 M ammonium bicarbonate (pH 10) solution for 20 hours at 50° C. (hydrolysis). Following hydrolysis, the material was washed successively with 1:1 v/v acetone/water, and acetone (all solvents from Fisher Scientific, Fairlawn, N.J.). The product was then dried at 80° C. under reduced pressure for 16 hours.

Step 2: For Phase 3, material from Step 1 was refluxed in toluene (5 mL/g, Fisher Scientific, Fairlawn, N.J.) using a Dean-Stark trap for 1 hour. Upon cooling, imidazole (Aldrich, Milwaukee, Wis.) and triethylchlorosilane (TECS, Gelest Inc., Morrisville, Pa.) were added and the reaction was heated to reflux for 4 hrs. The reaction was then cooled and, imidazole and trimetylchlorosilane (TMCS, Aldrich, Milwaukee, Wis.) were added to the reaction. The reaction was then heated to reflux for an additional 16 hrs after which the reaction was cooled and the product filtered and washed successively with toluene, 1:1 v/v acetone/water, and acetone (all solvents from Fisher Scientific, Fairlawn, N.J.). The product was then dried at 80° C. under reduced pressure for 16 hrs.

Information related to the HPCM phases with ionizable modifier and alkyl hydrophobic groups can be found below:

| Base Particle Material | |
|---|---|
| B1 | Hybrid Organic Silica (2.9 μm, 300 Å APD, 90 m²/g SSA)[1] |
| B2 | Hybrid Organic Silica (3.9 μm, 300 Å APD, 90 m²/g SSA)[1] |
| B3 | Hybrid Organic Silica (5.0 μm, 300 Å APD, 90 m²/g SSA)[1] |

[1]As described in U.S. Pat. No. 7,919,177, U.S. Pat. No. 7,223,473, U.S. Pat. No. 6,686,035

| Phase | Base Particle | 4PE Charge (μmol/m²) | Component A Silane Additive | Alkyl Hydrophobic group Coverage (μmol/m²) |
|---|---|---|---|---|
| Phase 2 | B1 | 0.3 | t-BDC | 2.0 |
| Phase 3 | B2 | 0.3 | C8 | 1.9 |
| Phase 5 | B3 | 0.2 | t-BDC | 2.1 |
| Phase 6 | B3 | 0.1 | t-BDC | 2.0 |

Example 3

Screening the Mixed-Mode Retentivity of Stationary Phases

Various high purity chromatographic materials (HCPMs) were screened using RapiFluor-MS™ reagent labeled glycans from human IgG (hIgG) and a simple linear gradient one-dimensional separation.

N-glycans from human IgG (Sigma 14506) and bovine fetuin (Sigma F3004) were labeled with RapiFluor-MS™ reagent according to previously published conditions. (Lauber, M. A.; Yu, Y. Q.; Brousmiche, D. W.; Hua, Z.; Koza, S. M.; Magnelli, P.; Guthrie, E.; Taron, C. H.; Fountain, K. J., Rapid Preparation of Released N-Glycans for HILIC Analysis Using a Labeling Reagent that Facilitates Sensitive Fluorescence and ESI-MS Detection. Anal Chem 2015, 87 (10), 5401-9). LC-MS analyses to produce the data shown in FIG. 3, FIG. 4 and FIG. 6 were performed using the conditions noted below.

LC Conditions as used with a Waters ACQUITY UPLC H-Class Bio:
Column: Phases 1-6, 2.1×150 mm
Mobile Phase A: 17 mM Acetic Acid/1 mM Ammonium Formate
Mobile Phase B: 20:80 Water/Acetonitrile
Column Temperature: 60° C.
Injection Volume: 4 μL
Sample Concentration: 10 pmol/μL
Sample Diluent: Water
Fluorescence Detection: Ex 265 nm/Em 425 nm (10 Hz)
Gradient Table:

| Time(min) | Flow Rate(mL/min) | % A | % B | Curve |
|---|---|---|---|---|
| Initial | 0.200 | 99.4 | 0.6 | Initial |
| 21.50 | 0.200 | 60.0 | 40.0 | 6 |
| 22.50 | 0.200 | 10.0 | 90.0 | 6 |
| 23.50 | 0.200 | 99.4 | 0.6 | 6 |
| 39.00 | 0.200 | 99.4 | 0.6 | 6 |

MS Conditions as used with a Waters Xevo G2-XS QTof system:
Polarity ES+
Acquisition: 700-2000 m/z (2 Hz)
Capillary (kV) 3
Source Temperature (° C.) 100
Sampling Cone 30
Source Offset 50
Desolvation Temperature (° C.) 300
Desolvation Gas Flow (L/Hr) 800

Example 4

Trap-Elute Mixed-Mode Chromatography

Trap-elute chromatography was performed with a configuration as portrayed in FIG. 3 according to the LC-MS conditions listed below. Data corresponding to these experimental conditions are represented in FIGS. 5, 7,8, and 9.

LC Conditions as used with a Waters ACQUITY UPLC H-Class Bio:
Trapping Column: Phase 2, 3, 4, 5, or 6; 2.1×30 mm
Analytical Column: Waters Prototype DEAP HPCM 130 Å 1.7 μm; 2.1×150 mm
Mobile Phase A: Water (or Ammonium Formate/Formic Acid concentrations as noted in FIGS. 5, 7, 8, and 9)
Mobile Phase B: 100 mM Ammonium Formate/100 mM Formic Acid in 60:40 ACN/water (or 50 mM Ammonium Formate/50 mM Formic Acid in 60:40 ACN/water to produce FIGS. 9B and 9C)
Column Temperature: 60° C.
Injection Volume: 4
Sample Concentration: 10 pmol/μL
Sample Diluent: Water
Fluorescence Detection: Ex 265 nm/Em 425 nm (10 Hz)
Trapping Gradient Table:

| Time(min) | Flow Rate (mL/min) | % A | % B | Curve |
|---|---|---|---|---|
| Initial | 0.400 | 100.00 | 0.00 | Initial |
| 00.10 | 1.500 | 100.00 | 0.00 | 6 |
| 03.00 | 1.500 | 100.00 | 0.00 | 6 |

Analytical Gradient Table:

| Time(min) | Flow Rate (mL/min) | % A | % B | Curve |
|---|---|---|---|---|
| Initial | 0.400 | 100.0 | 0.0 | Initial |
| 36.00 | 0.400 | 78.0 | 22.0 | 6 |
| 36.30 | 0.400 | 0.0 | 100.0 | 6 |
| 36.60 | 0.400 | 0.0 | 100.0 | 6 |
| 36.90 | 0.400 | 100.0 | 0.0 | 6 |
| 45.00 | 0.400 | 100.0 | 0.0 | 6 |

MS Conditions as used with a Waters Xevo G2-XS QTof system:
Polarity ES+
Acquisition: 700-2000 m/z (2 Hz)
Capillary (kV) 3
Source Temperature (° C.) 100
Sampling Cone 30
Source Offset 50
Desolvation Temperature (° C.) 300
Desolvation Gas Flow (L/Hr) 800

The invention claimed is:
1. A liquid chromatography system comprising:
   (a) a trapping column comprising a first chromatographic material having a first chromatographic surface that comprises first hydrophobic surface groups and first ionizable surface groups having a first pKa value,
   (b) an analytical column comprising a second chromatographic material having a second chromatographic surface that comprises second hydrophobic surface groups having a hydrophobicity that is greater than a hydrophobicity of the first hydrophobic surface groups and (i) permanently ionized surface groups or (ii) second ionizable surface groups having a second pKa value that differs from the first pKa value by 1-12 units, (c) an injector for introducing a liquid sample into the system, (d) a detector capable of detecting a property of the components, (e) a first flow path including the injector and the trapping column but not the analytical column, (f) a second flow path including the trapping column and the analytical column, and (g) one or more mobile phase delivery sources configured to pump a first mobile phase along the first flow path and to pump a second mobile phase along the second flow path.

2. The liquid chromatography system of claim 1, wherein the one or more mobile phase delivery sources comprise a first pump that is configured to pump the first mobile phase along the first flow path, and a second pump, which may be the same as or different from the first pump, that is configured to pump the second mobile phase along the second flow path.

3. The liquid chromatography system of claim 1, wherein the first chromatographic material is in the form of first particles and wherein the second chromatographic material is in the form of second particles.

4. The liquid chromatography system of claim 3, wherein a first diameter of the first particles is greater than or equal to a second diameter of the second particles.

5. The liquid chromatography system of claim 4, wherein a ratio of the first particle diameter to the second particle diameter ranges from 1 to 10.

6. The liquid chromatography system of claim 4, wherein the first diameter ranges from 2 to 10 microns.

7. The liquid chromatography system of claim 1, wherein the trapping column has an internal diameter that is greater than or equal to an internal diameter of the analytical column and wherein the trapping column has a length that is shorter than a length of the analytical column.

8. The liquid chromatography system of claim 1, wherein the trapping column has an internal diameter that is 1.5-5 times greater than an internal diameter of the analytical column.

9. The liquid chromatography system of claim 1, wherein a volume of the trapping column ranges from 0.05-0.5 times a volume of the analytical column.

10. The liquid chromatography system of claim 1, wherein the first and second hydrophobic surface groups are hydrocarbon groups, and wherein the second hydrophobic surface groups contain more carbon atoms than the first hydrophobic surface groups.

11. The liquid chromatography system of claim 10, wherein the second hydrocarbon groups contain 2-20 more carbon atoms than the first hydrocarbon groups.

12. The liquid chromatography system of claim 10, wherein the first hydrocarbon groups are first alky groups that contain from 3 to 8 carbon atoms and wherein the second hydrocarbon groups are second alkyl groups that contain from 10 to 24 carbon atoms.

13. The liquid chromatography system of claim 12, wherein the first alky groups contain 4 carbon atoms and wherein the second groups contain 18 carbon atoms.

14. The liquid chromatography system of claim 1, wherein the first ionizable groups are present in a surface concentration that is less than or equal to a surface concentration of the permanently ionized or second ionizable groups.

15. The liquid chromatography system of claim 1, wherein the first ionizable groups are present in a surface concentration ranging from 0.03 to 0.3 micromoles per square meter.

16. The liquid chromatography system of claim 1, wherein the first ionizable groups and the permanently ionized or second ionizable groups are positively charged when ionized.

17. The liquid chromatography system of claim 16, wherein the second chromatographic surface comprises the second ionizable surface groups, wherein the first and second pKa values are greater than 3, and wherein the second pKa value is 1-7 units greater than the first pKa value.

18. The liquid chromatography system of claim 1, wherein (a) the first ionizable groups and (b) the permanently ionized or second ionizable groups comprise amine groups.

19. The liquid chromatography system of claim 18, wherein the first ionizable groups are selected from primary, secondary and tertiary amine groups and the permanently ionized or second ionizable groups are selected from secondary, tertiary and quaternary amine groups.

20. The liquid chromatography system of claim 1, wherein the first ionizable groups are selected from 4-pyridylethyl, 2-pyridylethyl, 2 imidazolinylpropropyl, 3-propylaniline and imidazole groups.

21. The liquid chromatography system of claim 1, wherein the second ionizable groups are selected from diethylaminopropyl, ethylaminopropyl, dimethylaminopropyl, methylaminopropyl, aminopropyl, diethylaminomethyl, 3-[Bis(2-hydroxyethyl)amino]propyl, n-butyl-aza-silacyclopentane, n-methyl-aza-silacyclopentane, and bis-3-methyl-aminopropyl silyl groups.

22. The liquid chromatography system of claim 1 wherein the molar ratio of the first hydrophobic surface groups to the first ionizable groups ranges from 5:1 to 200:1.

23. The liquid chromatography system of claim 1, wherein the first and second ionizable groups are negatively charged when ionized.

24. The liquid chromatography system of claim 23, wherein the first ionizable groups are carboxylic acid groups and wherein the second ionizable groups are selected from sulfonic acid groups and carboxylic acid groups.

25. The liquid chromatography system of claim 23, wherein the second pKa value is 1-4 units less than the first pKa value.

26. The liquid chromatography system of claim 1, wherein the first chromatographic material is in the form of first particles having a core of a first material, and wherein the second chromatographic material is in the form of second particles having a core of a second material.

27. The liquid chromatography system of claim 1, wherein the injector comprises a sample loop or a flow through needle.

28. A method for performing liquid chromatography on a liquid sample including a plurality of components using the liquid chromatography system of claim 1, the method comprising:

introducing the liquid sample into the system via the injector;

flowing the first mobile phase through the first flow path using the one or more mobile phase delivery sources such that the liquid sample is guided through the trapping column and such that the trapping column traps at least a portion of the components of the liquid sample as trapped components;

flowing the second mobile phase through the second flow path using the one or more mobile phase delivery sources, wherein flowing through the second flow path includes flowing the second mobile phase (a) through the trapping column such that at least some of the trapped components are eluted from the trapping column as eluted components and (b) through the analytical column such that at least some of the eluted components are separated as separated components; and flowing the separated eluted components to the detector.

* * * * *